(12) United States Patent
Potter et al.

(10) Patent No.: US 10,227,999 B2
(45) Date of Patent: *Mar. 12, 2019

(54) ROTARY HYDRAULIC VALVE

(71) Applicant: Boston Dynamics, Inc., Waltham, MA (US)

(72) Inventors: Steven D. Potter, Bedford, MA (US); John Aaron Saunders, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,340

(22) Filed: Feb. 22, 2017

(65) Prior Publication Data

US 2017/0159680 A1    Jun. 8, 2017

Related U.S. Application Data

(63) Continuation of application No. 14/827,531, filed on Aug. 17, 2015, now Pat. No. 9,611,946.

(51) Int. Cl.
| | |
|---|---|
| *F15B 13/04* | (2006.01) |
| *F16K 11/085* | (2006.01) |
| *F16K 31/04* | (2006.01) |
| *F15B 11/10* | (2006.01) |

(52) U.S. Cl.
CPC .......... *F15B 13/0406* (2013.01); *F15B 11/10* (2013.01); *F16K 11/0856* (2013.01); *F16K 31/041* (2013.01); *F15B 2211/30525* (2013.01); *F15B 2211/7055* (2013.01)

(58) Field of Classification Search
None
See application file for complete search history.

(56) References Cited

U.S. PATENT DOCUMENTS

| | | |
|---|---|---|
| 944,026 A | 12/1909 | Fowden |
| 2,547,929 A | 4/1951 | Dawson |
| 2,675,679 A | 4/1954 | Parker |
| 2,998,023 A | 8/1961 | Campbell |
| RE25,126 E | 2/1962 | Charleson |
| 3,072,146 A | 1/1963 | Gizeski |
| 3,199,539 A | 8/1965 | Leathem |
| 3,454,049 A | 7/1969 | Hoos |
| 3,603,207 A | 9/1971 | Parrett |
| 3,774,634 A | 11/1973 | Bonney |
| 3,805,838 A | 4/1974 | Christensen |
| 3,832,937 A | 9/1974 | Moore et al. |
| 4,140,953 A | 2/1979 | Dunne |
| 4,199,007 A | 4/1980 | Holmes |
| 4,216,702 A | 8/1980 | Brundidge et al. |
| 4,311,171 A | 1/1982 | Roberts |
| 4,738,283 A | 4/1988 | Shirai et al. |

(Continued)

*Primary Examiner* — John Fox
(74) *Attorney, Agent, or Firm* — Honigman LLP

(57) ABSTRACT

An example valve includes a sleeve having a plurality of openings. A spool is rotatable within the sleeve and includes a respective plurality of openings corresponding to the plurality of openings of the sleeve. A rotary actuator coupled to the spool is configured for rotating the spool within the sleeve to one of at least eight rotary positions. The rotary actuator can rotate the spool to a given rotary position in a clockwise or a counter-clockwise direction to cause at least a partial alignment between a subset of the respective plurality of openings of the spool and a subset of the plurality of openings of the sleeve.

17 Claims, 26 Drawing Sheets

(56) References Cited

U.S. PATENT DOCUMENTS

| | | |
|---|---|---|
| 4,800,924 A | 1/1989 | Johnson |
| 4,804,016 A | 2/1989 | Novacek et al. |
| 4,838,145 A | 6/1989 | Slocum et al. |
| 4,858,650 A | 8/1989 | Devaud et al. |
| 5,020,417 A | 6/1991 | Weyer |
| 5,197,285 A | 3/1993 | Dunwoody |
| 5,263,512 A | 11/1993 | Emori et al. |
| 5,269,215 A | 12/1993 | Phillips |
| 5,467,800 A | 11/1995 | Sallas |
| 5,954,093 A | 9/1999 | Leonard |
| 5,975,137 A | 11/1999 | Strong |
| 6,269,838 B1 | 8/2001 | Woodworth et al. |
| 6,594,992 B1 | 7/2003 | Naito et al. |
| 7,322,375 B2 | 1/2008 | Goldfarb et al. |
| 7,735,517 B2 | 6/2010 | Kerckhove et al. |
| 7,802,589 B2 | 9/2010 | Oh et al. |
| 9,127,694 B2 | 9/2015 | Greeb et al. |
| 9,494,168 B2 | 11/2016 | Lind et al. |

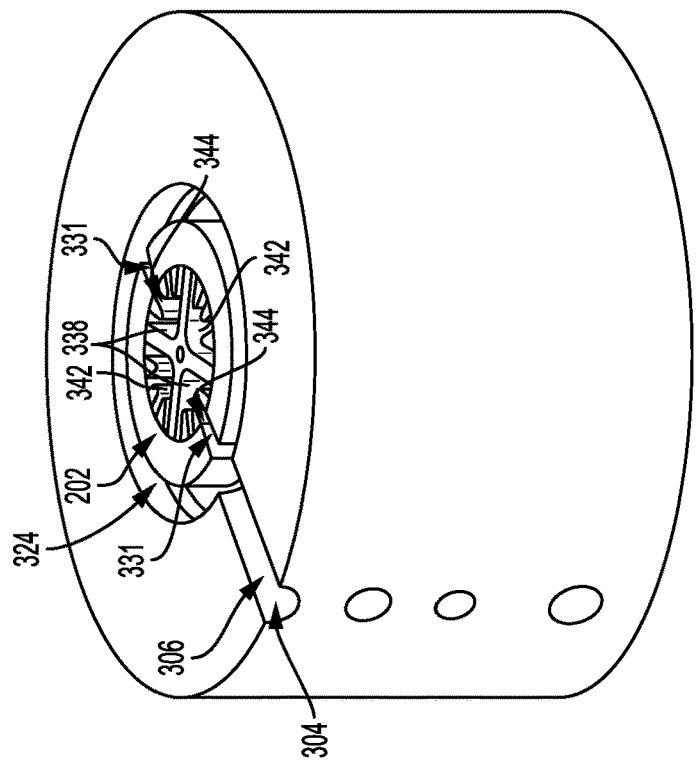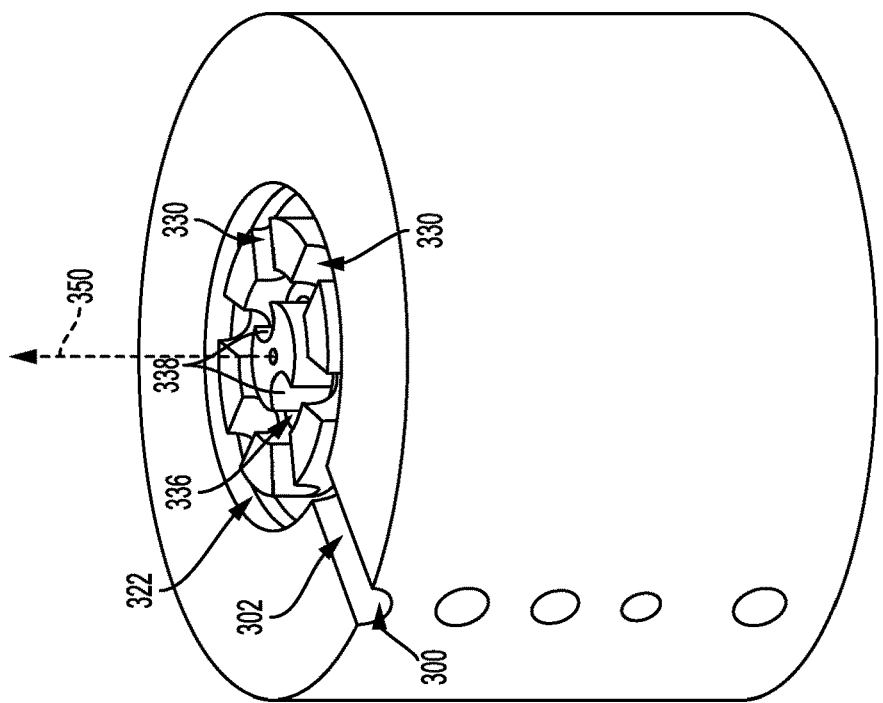
FIGURE 4B
FIGURE 4A

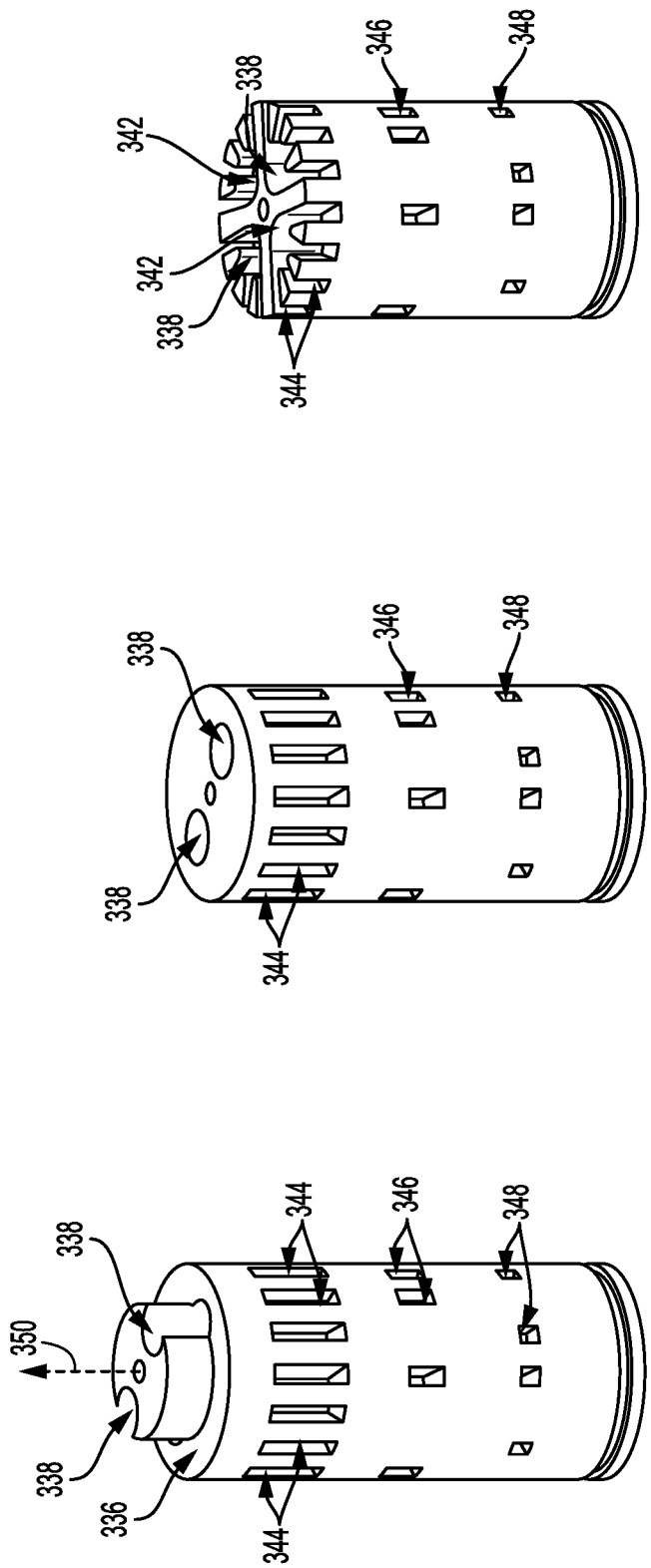

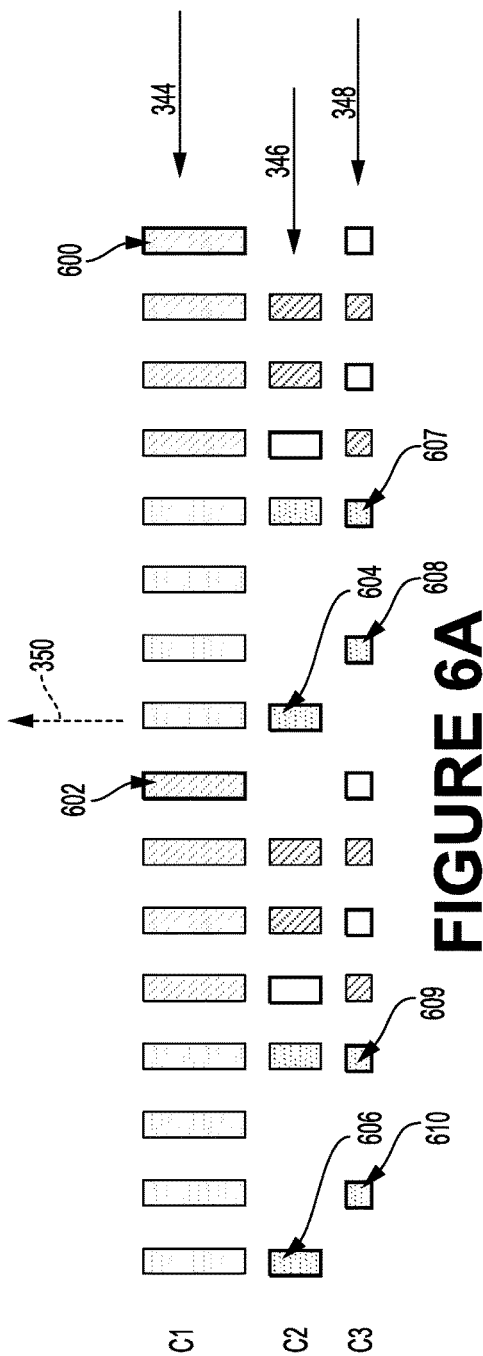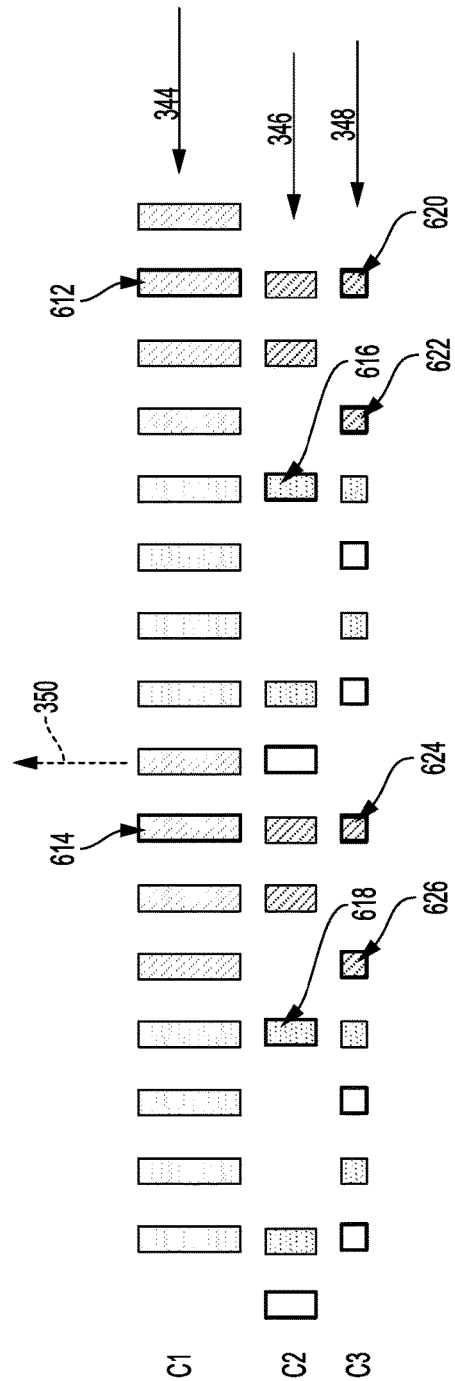

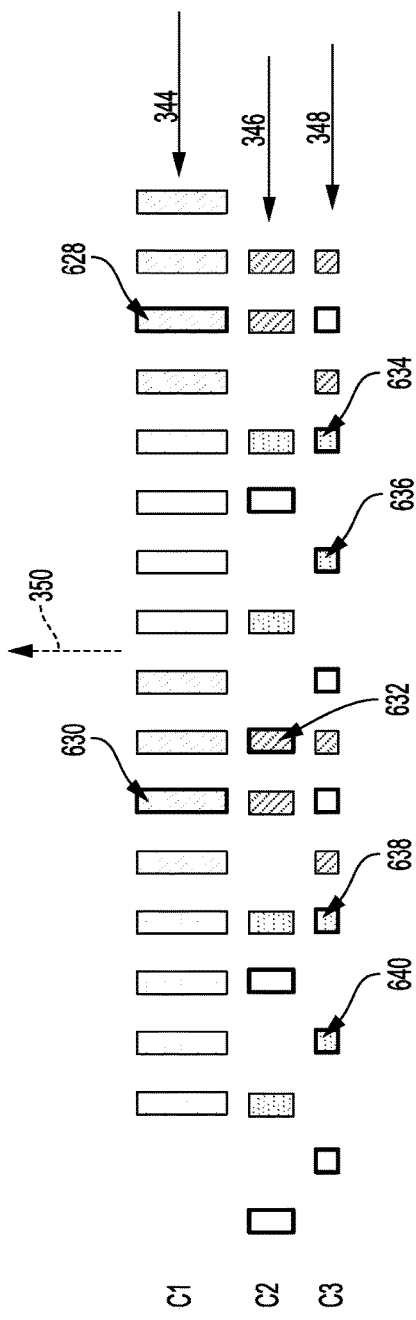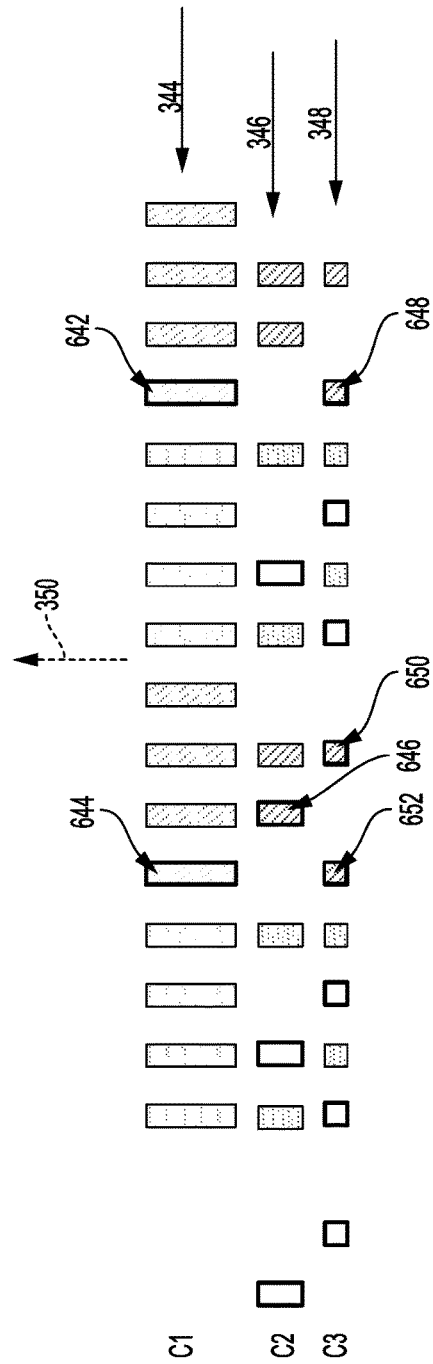

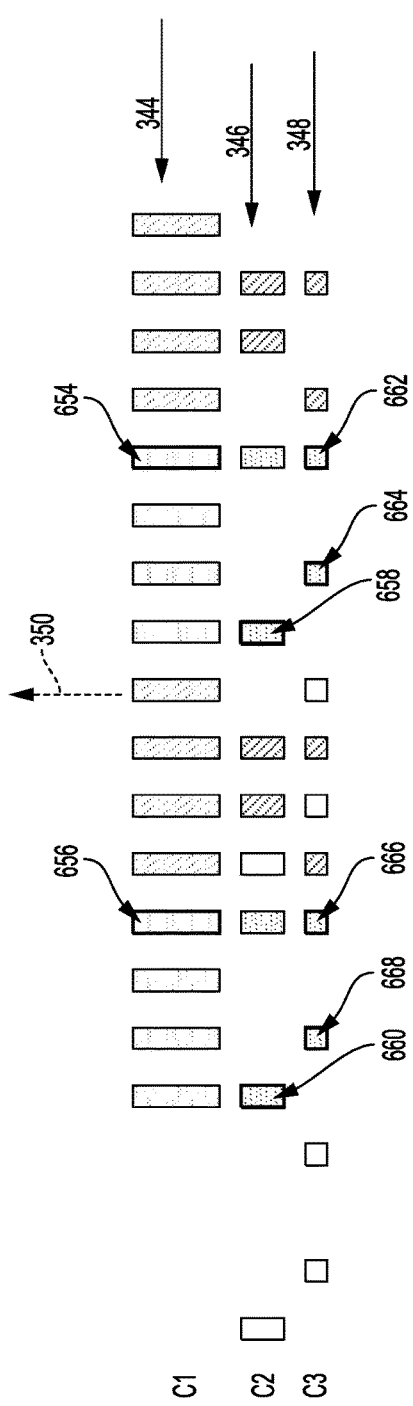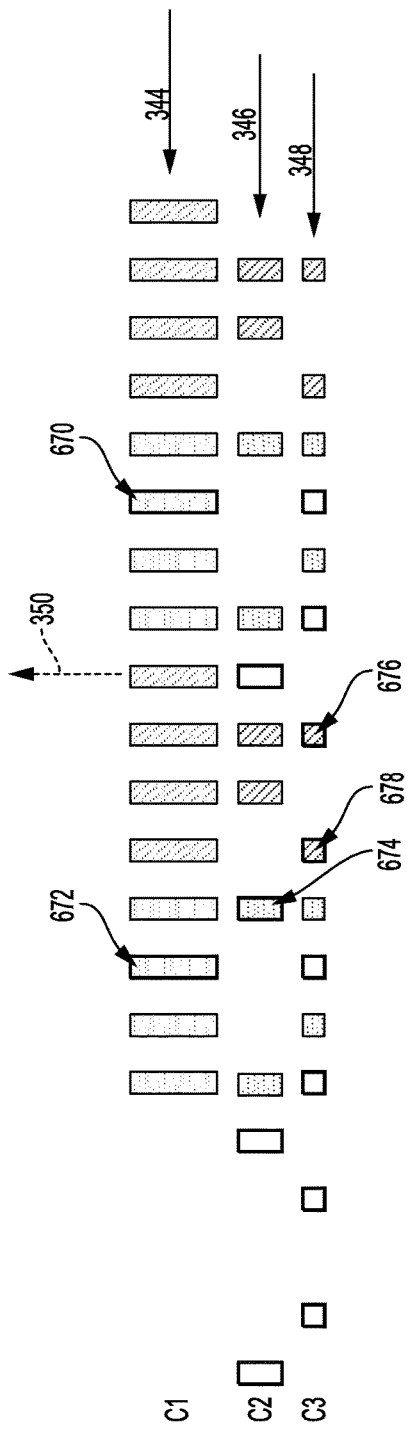

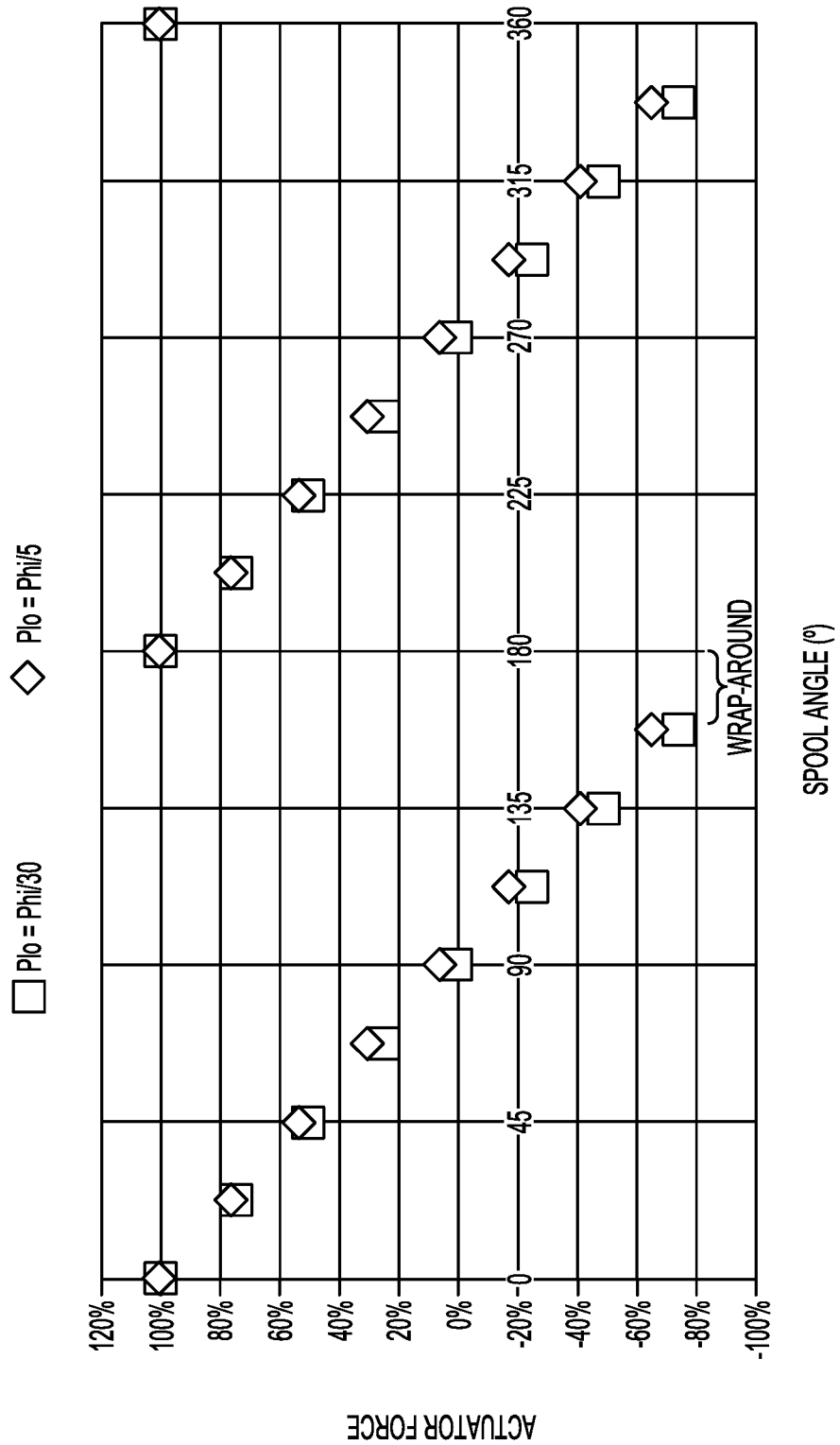

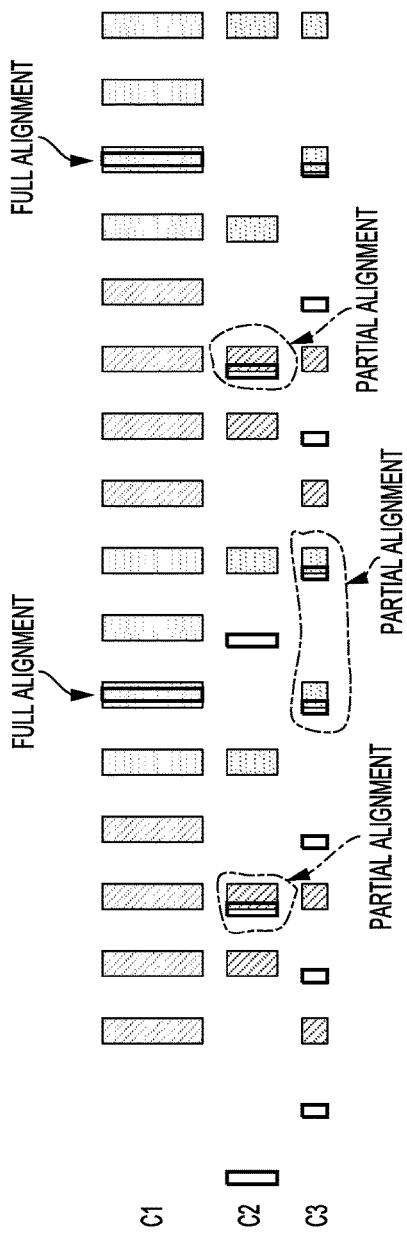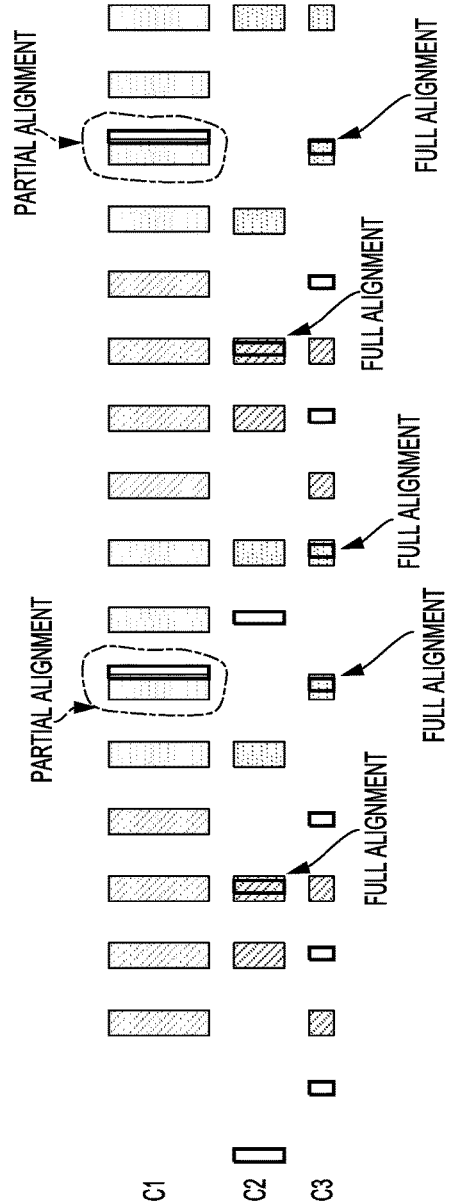

ROTARY HYDRAULIC VALVE

CROSS REFERENCE TO RELATED APPLICATION

The present application is a continuation of U.S. patent application Ser. No. 14/827,531, filed on Aug. 17, 2015, and entitled "Rotary Hydraulic Valve," which is herein incorporated by reference as if fully set forth in this description.

BACKGROUND

Hydraulic systems may include an actuator that is powered by hydraulic fluid supplied from a hydraulic fluid source, such as a pump. A valve can be used to control hydraulic fluid flow to and from the actuator. For instance, the valve can control flow from the pump to the actuator and flow from the actuator to a tank or reservoir. The valve is controlled to vary the resistance to flow so as to control the speed and direction of motion of the actuator.

SUMMARY

The present disclosure describes implementations that relate to a rotary hydraulic valve. In a first aspect, the present disclosure describes a rotary valve. The rotary valve includes a sleeve having a plurality of sleeve openings. The plurality of openings include at least: a first opening configured to communicate fluid to and from a high pressure fluid source, a second opening configured to communicate fluid to and from a low pressure fluid reservoir, a third opening configured to communicate fluid to and from a first chamber of a hydraulic actuator, a fourth opening configured to communicate fluid to and from a second chamber of the hydraulic actuator, and a fifth opening configured to communicate fluid to and from a third chamber of the hydraulic actuator. The rotary valve also includes a spool rotatable within the sleeve. The spool includes a plurality of spool openings respectively corresponding to the plurality of sleeve openings. The spool has two high pressure internal channels in fluid communication with the high pressure fluid source and two low pressure internal channels in fluid communication with the low pressure fluid reservoir. The two high pressure internal channels are 1×1 interleaved with the two low pressure internal channels. The rotary valve further includes a rotary actuator coupled to the spool and configured to rotate the spool within the sleeve in clockwise and counter-clockwise directions. Rotating the spool causes the spool to assume one rotary position of at least eight rotary positions. At each rotary position, a subset of the plurality of spool openings is at least partially aligned with a subset of the plurality of sleeve openings, to connect (i) the first chamber to either the high pressure fluid source or the low pressure fluid reservoir, (ii) the second chamber to either the high pressure fluid source or the low pressure fluid reservoir, and (iii) the third chamber to either the high pressure fluid source or the low pressure fluid reservoir.

In a second aspect, the present disclosure describes another rotary valve. The rotary valve includes a sleeve having a plurality of sleeve openings. The plurality of openings include at least: a first opening configured to communicate fluid to and from a high pressure fluid source, a second opening configured to communicate fluid to and from a low pressure fluid reservoir, a third opening configured to communicate fluid to and from a first chamber of a hydraulic actuator, a fourth opening configured to communicate fluid to and from a second chamber of the hydraulic actuator, and a fifth opening configured to communicate fluid to and from a third chamber of the hydraulic actuator. The rotary valve also includes a spool rotatable within the sleeve. The spool includes a plurality of spool openings respectively corresponding to the plurality of sleeve openings. The spool a high pressure internal channel longitudinally stacked in-line with a low pressure internal channel. The rotary valve further includes a rotary actuator coupled to the spool and configured to rotate the spool within the sleeve in clockwise and counter-clockwise directions. Rotating the spool causes the spool to assume one rotary position of at least eight rotary positions. At each rotary position, a subset of the plurality of spool openings is at least partially aligned with a subset of the plurality of sleeve openings, to connect (i) the first chamber to either the high pressure fluid source or the low pressure fluid reservoir, (ii) the second chamber to either the high pressure fluid source or the low pressure fluid reservoir, and (iii) the third chamber to either the high pressure fluid source or the low pressure fluid reservoir.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIGS. 4A-4E illustrate cross sections of the rotary valve at various levels or elevations while the spool is at a particular rotary position, in accordance with an example implementation.

FIGS. 5A-5E illustrate cross sections of the spool at various levels or elevations while the spool is at a particular rotary position, in accordance with an example implementation.

FIGS. 6A-6H illustrate a schematic of the spool at eight different rotary positions, in accordance with an example implementation.

FIG. 7 illustrates variation of force level with different spool rotary positions, in accordance with an example implementation.

FIG. 11A illustrates metering while the piston is extending, with load assistance, and a chamber regenerating fluid back to the high pressure fluid source, in accordance with an example implementation.

FIG. 11B illustrates metering while the piston is retracting, with load assistance, and the chamber connected to the high pressure fluid source, in accordance with an example implementation.

DETAILED DESCRIPTION

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

I. INTRODUCTION

An example hydraulic system may include multiple actuators (e.g., hydraulic cylinders, rotary vane-actuators and hydraulic motors). In some examples, the hydraulic system may have a single pressure source driving the actuators. Such a hydraulic system may be referred to as a "single pressure rail" system. In a single pressure rail system, a hydraulic pump may maintain a source of supply pressure, and multiple valves are used to control flow to hydraulic actuators.

However, these systems may be inefficient because the actuators are sized for a peak force (or torque), but most of the time a lesser force is required. Thus, most of the hydraulic energy is lost in the servo valves that throttle the flow to each actuator. For instance, in situations where an actuator exerts negative work (e.g., perform a movement assisted by gravity), such a hydraulic system would still use high-pressure fluid to perform the work. As another example, the actuator may exert positive work, e.g., lift an object against gravity or accelerate a limb of a robot. But the positive work is then followed by lowering the object or decelerating the limb assisted by gravity, where high pressure is not needed. For these applications, improving hydraulic efficiency can reduce energy consumption, which may result in reduction in weight of fuel or batteries and cost.

Hydraulic systems can be made more efficient by reducing throttling losses across the valves. One approach involves the hydraulic system using valves and actuators capable of providing multiple force levels as needed to reduce throttling losses when the actuator is producing intermediate forces.

Figure 1:
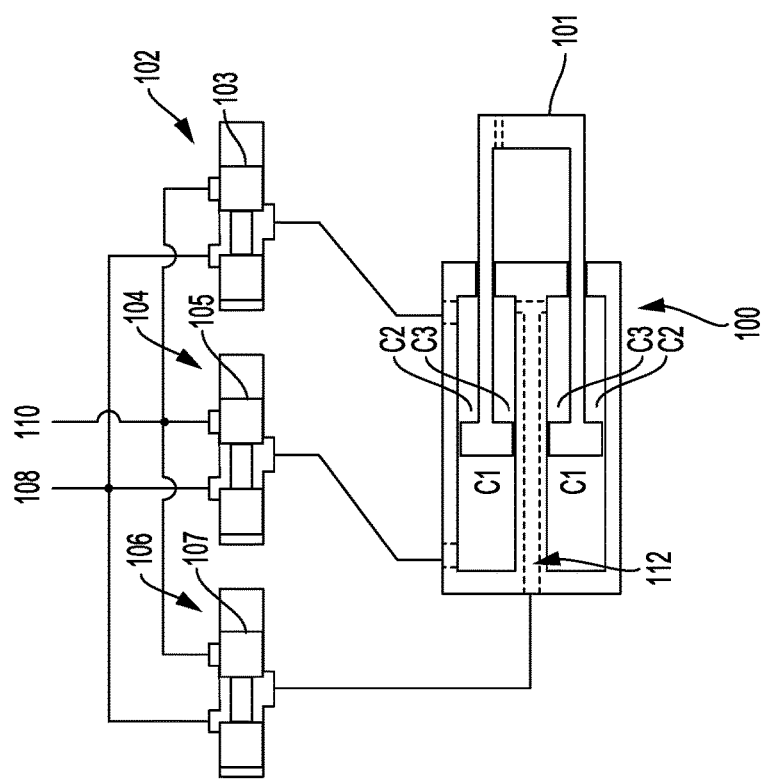
FIG. 1 illustrates a bi-directional hydraulic actuator having three chambers and capable of providing various force levels, in accordance with an example implementation.

FIG. 1 illustrates a bi-directional hydraulic actuator 100 having three chambers and capable of providing various force levels, in accordance with an example implementation. As shown in FIG. 1, a piston 101 of the actuator 100 has a nested concentric design that defines three different chambers C1, C2, and C3. Hydraulic fluid in each of the chambers C1, C2 exerts pressure on a respective piston area $A_1$, $A_2$, and $A_3$. Specifically, the piston area on which the hydraulic fluid applies pressure in the chamber C1 is $A_1$; the piston area on which the hydraulic fluid applies pressure in the chamber C2 is $A_2$; and the piston area on which the hydraulic fluid applies pressure in the chamber C3 is $A_3$. As an example for illustration, the three areas $A_1$, $A_2$, and $A_3$ may be designed to have area ratios of 4:2:1. In this example, the three-chamber actuator 100 is capable of applying 8 different force levels. In general, a bi-directional hydraulic actuator with N chambers may be capable of $2^N$ force levels.

FIG. 1 also shows three spool valves 102, 104, and 106 having linearly movable spools 103, 105, and 107 respectively. The three spool valves 102, 104, and 106 are each connected to a high pressure fluid source 108 (pressure=Phi) and a low pressure fluid reservoir 110 (pressure=Plo). Linear positions of the spools 103, 105, and 107 determine a hydraulic fluid pressure level in each of the three chambers C1, C2, and C3. For instance, in the positions shown in FIG. 1, all three chambers C1, C2, and C3 are connected to the high pressure fluid source 108. For the chamber C3, FIG. 1 shows that fluid is communicated from the high pressure fluid source 108 through the valve 106 and a channel 112. However, other actuator configurations are possible.

As depicted in FIG. 1, hydraulic fluid in the chambers C2 and C3 applies pressure on the piston 101 in a direction opposite to a respective pressure applied by hydraulic fluid in Chamber C1. Thus, the force applied to the piston 101 can be calculated using the following equation:

$$F = P_{C1}A_1 - P_{C2}A_2 - P_{C3}A_3 \quad (1)$$

where $P_{C1}$ is the fluid pressure applied to the piston area $A_1$ in the chamber C1, $P_{C2}$ is the fluid pressure applied to the piston area $A_2$ in the chamber C2, and $P_{C3}$ is the fluid pressure applied to the piston area $A_3$ in the chamber C3. As an example for illustration, assuming that $A_1$=4A, $A_2$=2A, and $A_3$=A, wherein A is a given area, and the pressure in the high pressure fluid source 108 is Phi, the force applied to piston 101 is:

$$F = Phi \times 4A - Phi \times 2A - Phi \times A = Phi \times A \quad (2)$$

The system shown in FIG. 1 is capable of providing 8 levels of force based on respective positions of the spools 103, 105, and 107. Table 1 below shows, for each of the 8 force levels, the hydraulic fluid pressure level in each chamber and the resulting force applied to the piston 101 (assuming fluid pressure Plo in the low pressure fluid reservoir 110 is zero). In Table 1, "hi" refers to a respective chamber being connected to the high pressure fluid source 108, and "lo" refers to the respective chamber being connected to the low pressure fluid reservoir 110. A positive force indicates a force that pushes the piston 101 in an extension direction (e.g., to the right in FIG. 1), while a negative force indicates a force that pulls the piston 101 in a retraction direction (e.g., to the left in FIG. 1).

As an example, a 100% force is applied to the piston 101 when C1 is connected to the high pressure fluid source 108, while both C2 and C3 are connected to the low pressure fluid reservoir 110. In this case the 100% force or the maximum force is:

$$F_{max} = Phi \times 4A - Plo \times 2A - Plo \times A \qquad (3)$$

A −75% force (75% of $F_{max}$ and in the opposite direction) is applied when both C2 and C3 are connected to the high pressure fluid source 108, while C1 is connected to low pressure fluid reservoir 110. Six other force levels can be achieved as shown in Table 1 depending on fluid pressure level in each of the chambers C1, C2, and C3.

TABLE 1

| C1 | C2 | C3 | Force |
|----|----|----|-------|
| hi | lo | lo | 100% |
| hi | lo | hi | 75% |
| hi | hi | lo | 50% |
| hi | hi | hi | 25% |
| lo | lo | lo | 0% |
| lo | lo | hi | −25% |
| lo | hi | lo | −50% |
| lo | hi | hi | −75% |

Disclosed herein is lightweight, compact, rotary valve that replaces the three valves 102, 104, and 106 to simplify the system shown in FIG. 1. As a consequence, the disclosed rotary valve reduces the cost, size, and complexity of the hydraulic system.

II. EXAMPLE ROTARY VALVE

Figure 2:
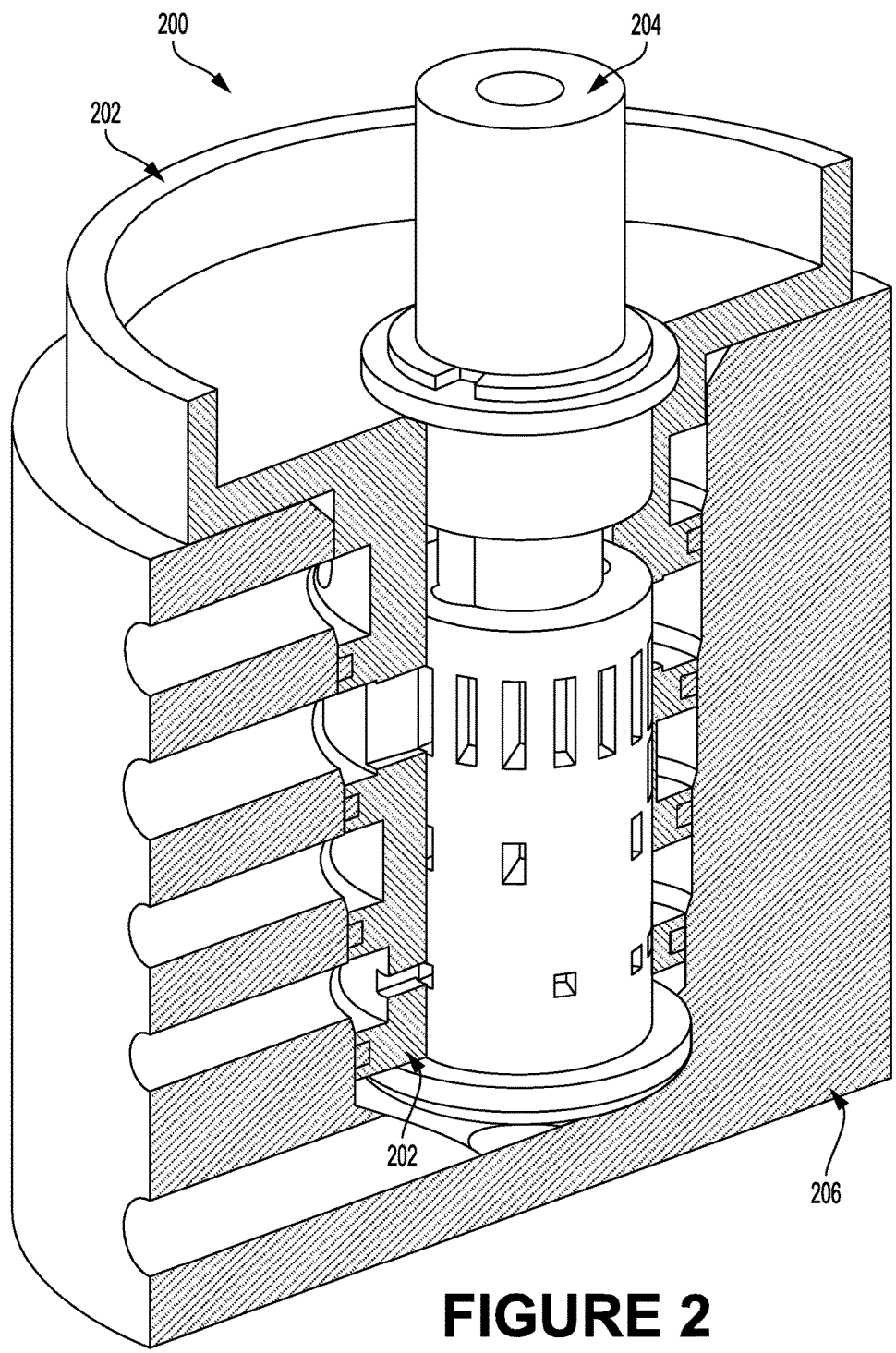
FIG. 2 illustrates a rotary valve configured to control a multi-area actuator, in accordance with an example implementation.

FIG. 2 illustrates a rotary valve 200 configured to control a multi-area actuator such as the actuator 100, in accordance with an example implementation. The rotary valve 200 includes a sleeve 202, a spool 204 rotatable within the sleeve, and a manifold 206 configured to house the sleeve 202 and the spool 204 rotatable therein.

The term "opening" is used in the remainder of the disclosure to refer generally to holes (whether through-holes or blocked holes), grooves (e.g., annular grooves, circumferential grooves etc.), radial ports, windows, etc.

Figure 3A:
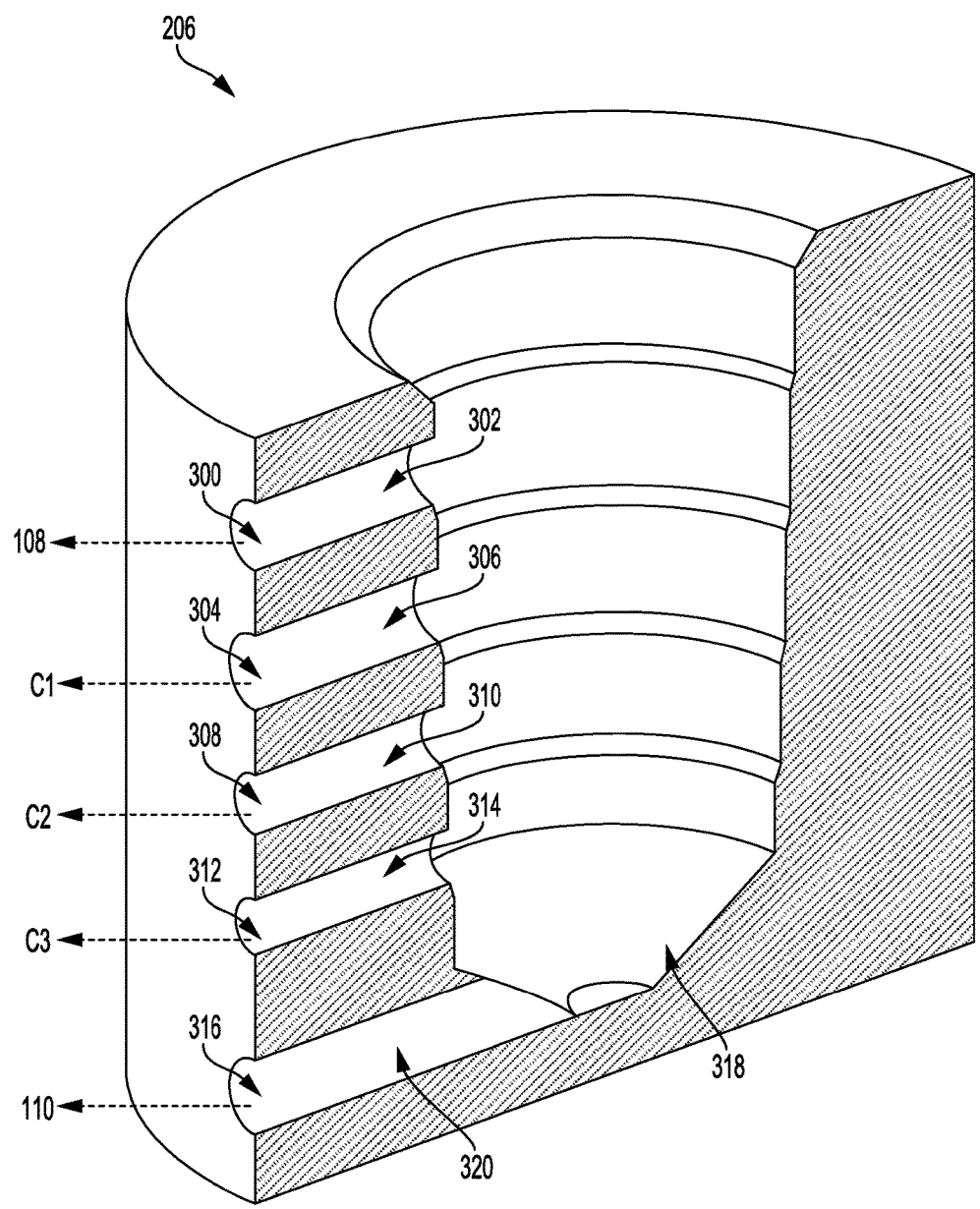
FIG. 3A illustrates a manifold, in accordance with an example implementation.

FIG. 3A illustrates the manifold 206, in accordance with an example implementation. As shown in FIG. 3A, the manifold 206 includes an opening or port 300 that is configured to communicate fluid to and from the high pressure fluid source 108. The port 300 is also configured to communicate fluid to and from a corresponding opening in the sleeve 202 by way of a channel 302. The manifold 206 also includes an opening or port 304 configured to communicate fluid to and from the chamber C1 of the actuator 100. The port 304 is also configured to communicate fluid to and from a corresponding opening in the sleeve 202 by way of a channel 306.

Similarly, the manifold 206 includes an opening or port 308 configured to communicate fluid to and from the chamber C2 of the actuator 100. The port 308 is also configured to communicate fluid to and from a corresponding opening in the sleeve 202 by way of a channel 310. Also, the manifold 206 includes an opening or port 312 configured to communicate fluid to and from the chamber C3 of the actuator 100. The port 312 is also configured to communicate fluid to and from a corresponding opening in the sleeve 202 by way of a channel 314. Further, the manifold 206 includes an opening or port 316 configured to communicate fluid to and from the low pressure fluid reservoir 110. The port 316 is configured to communicate fluid to and from a low pressure chamber 318 by way of a channel 320.

Figure 3B:
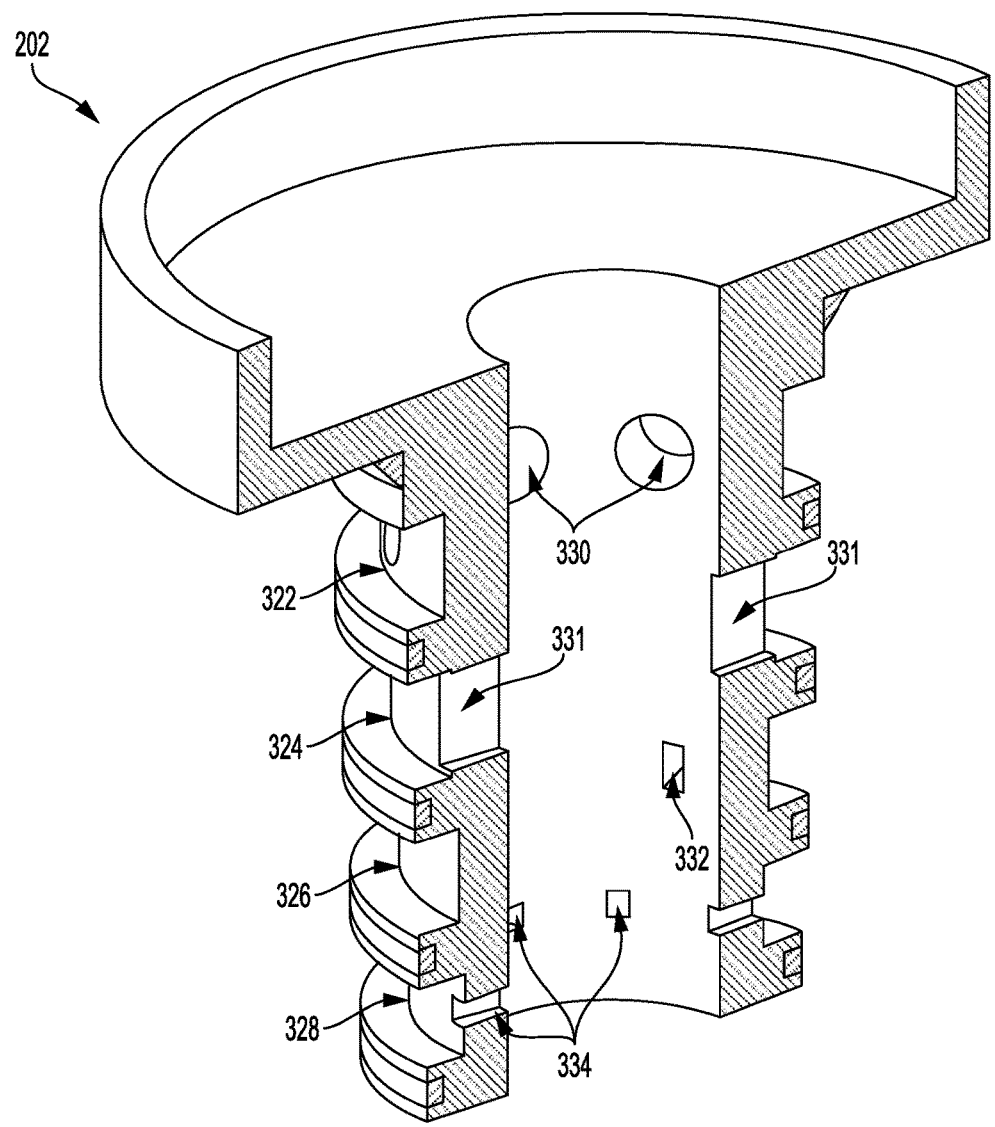
FIG. 3B illustrates a sleeve, in accordance with an example implementation.

FIG. 3B illustrates the sleeve 202, in accordance with an example implementation. The sleeve 202 includes a plurality of annular grooves 322, 324, 326, and 328 disposed longitudinally along a length of the sleeve 202. The annular groove 322 is configured to communicate fluid to and from the high pressure fluid source 108 by way of the channel 302 and the port 300 of the manifold 206. The annular groove 324 is configured to communicate fluid to and from the chamber C1 of the actuator 100 by way of the channel 306 and the port 304 of the manifold 206. The annular groove 326 is configured to communicate fluid to and from the chamber C2 of the actuator 100 by way of the channel 310 and the port 308 of the manifold 206. The annular groove 328 is configured to communicate fluid to and from the chamber C3 of the actuator 100 by way of the channel 314 and the port 312 of the manifold 206. The order of the openings and the annular grooves along a length of the sleeve 202 may vary based on application and desired configuration of the rotary valve 200.

Further, the sleeve 202 includes a plurality of openings to communicate fluid to and from respective openings in the spool 204. For instance, openings 330 are disposed in the annular groove 322. The openings 330 in the annular groove 322 may be disposed in a circular array along a circumference of the sleeve 202 within the annular groove 322. For example, a number of N openings 330 may be disposed along the circumference of the sleeve 202 spaced 360°/N apart from each other. However, in other examples, the openings 330 may not be evenly spaced. The term "circular array" is used herein to include both evenly spaced and unevenly spaced openings configurations. The openings 330 are configured to communicate fluid to and from the high pressure fluid source 108 by way of the annular groove 322.

The annular groove 324 also includes respective openings or windows 331. Such openings or windows are configured to communicate fluid to and from the chamber C1 of the actuator 100 by way of the annular groove 324.

The annular groove 326 includes windows as well such as a window 332. Multiple windows similar to the window 332 may be disposed within the annular groove 326 along a circumference (e.g., in a circular array) of the sleeve 202. The window(s) 332 are configured to communicate fluid to and from the chamber C2 of the actuator 100 by way of the annular groove 326.

Similarly, the annular groove 328 includes windows 334. Multiple windows 334 may be disposed within the annular groove 328 along a circumference of the sleeve 202. For example, the windows 334 may be disposed in a circular array within the annular groove 328 along the circumference of the sleeve 202 The windows 334 are configured to communicate fluid to and from the chamber C3 of the actuator 100 by way of the annular groove 328.

Figure 3C:
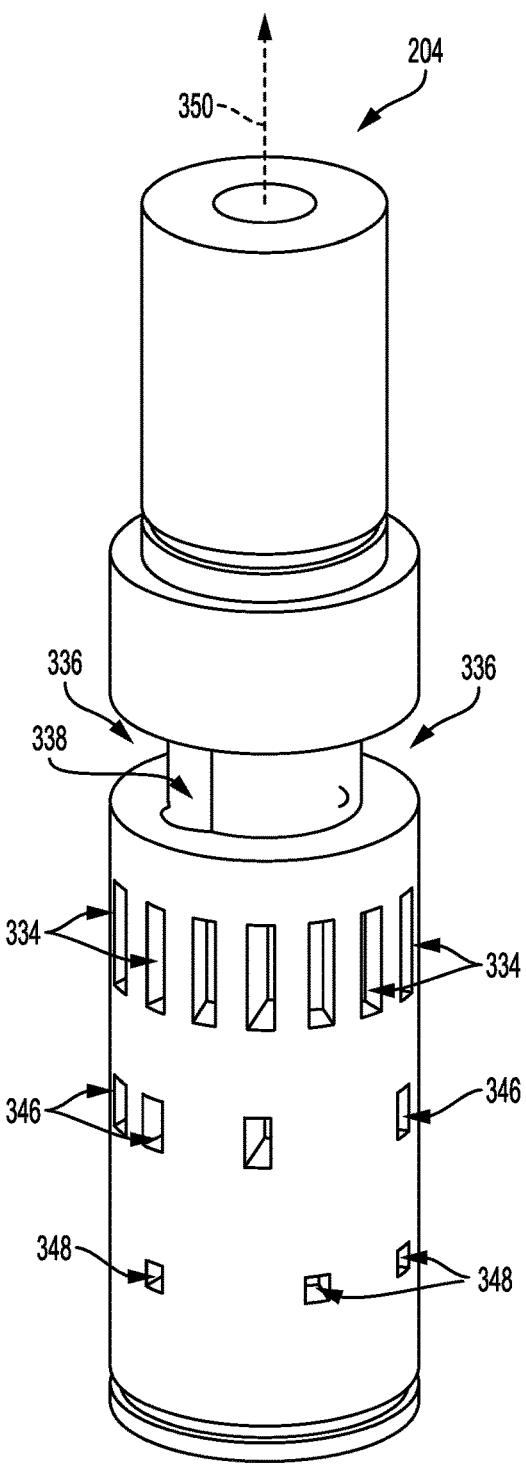
FIGS. 3C-3D illustrate a spool, in accordance with an example implementation
Figure 3D:
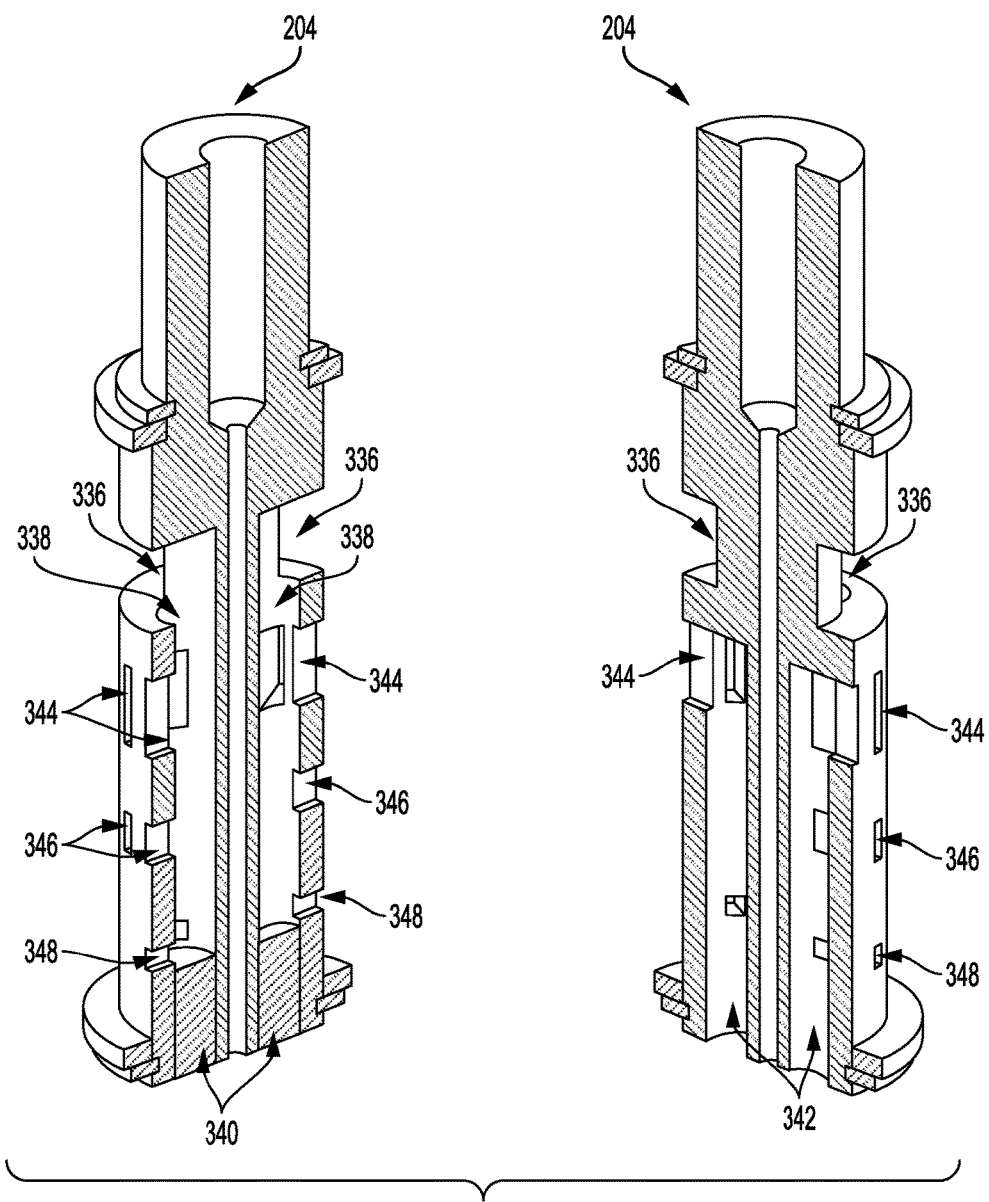

FIGS. 3C-3D illustrate the spool 204, in accordance with an example implementation. Particularly, FIG. 3C illustrates a perspective view of the spool 204, and FIG. 3D illustrates cross sections of the spool 204 to show example internal details of the spool 204. FIGS. 3C-3D are described together.

The spool 204 includes an annular groove 336 that is in fluid communication with the openings 330 of the sleeve 202. Thus, the annular groove 336 is configured to communicate fluid to and from the high pressure fluid source 108 by way of the openings 330, the annular groove 322, the channel 302, and the port 300.

The annular groove 336 is also configured to communicate fluid to and from high pressure internal channels 338. Thus, the annular groove 336 can communicate high pressure fluid from the high pressure fluid source 108 to the high pressure internal channels 338, or communicate high pressure fluid from the internal channels 338 to the high pressure fluid source 108. The high pressure internal channels 338 are blocked at the bottom of the spool 204 by way of plugs 340.

Further, the spool 204 includes low pressure internal channels 342 configured to communicate fluid to and from the low pressure chamber 318 in the manifold 306, and can thus communicate fluid to and from the low pressure fluid reservoir 110.

As depicted in FIGS. 3C-3D, the two high pressure internal channels 338 are in a 1×1 interleaving configuration with the two low pressure internal channels 342. In this manner, the two high pressure internal channels 338 are separated by one of the two low pressure internal channels 342, and the two low pressure internal channels 342 are separated by one of the two high pressure internal channels 338. Thus, the two low pressure internal channels 342 may be disposed opposite each other and the two high pressure internal channels 338 may be disposed opposite each other. However, this configuration is an example for illustration only. More or fewer high pressure and low pressure channels can be used in various different configurations, and therefore the configuration illustrated in FIGS. 3C-3D is not meant to be limiting.

Further, the spool 204 includes openings or windows disposed longitudinally along a length of the spool 204. For example, the spool 204 includes windows 344 disposed along a circumference (e.g., in a circular array) of the spool 204. The windows 344 are configured to communicate fluid to and from the chamber C1 by way of the corresponding sleeve openings 331 in the annular groove 324, the annular groove 324, the channel 306, and the port 304.

Similarly, the spool 204 includes windows 346 disposed along the circumference (e.g., in a circular array) of the spool 204. The windows 346 are configured to communicate fluid to and from the chamber C2 by way of the corresponding sleeve windows 332 in the annular groove 326, the annular groove 326, the channel 310, and the port 308. Also, the spool 204 includes windows 348 disposed along a circumference (e.g., in a circular array) of the spool 204. The windows 348 are configured to communicate fluid to and from the chamber C3 by way of the corresponding sleeve windows 334 in the annular groove 328, the annular groove 328, the channel 314, and the port 312.

As shown in FIGS. 3C-3D, the windows 344 are larger in size than the windows 346 and 348 because the chamber C1 is larger in volume than the chambers C2 and C3. However, this configuration is an example for illustration only. Sizes of respective windows can be varied based on type and configuration of the actuator 100.

The rotary valve 200 may include a rotary actuator (not shown), such as an electric motor, or any other rotary actuator means. The rotary actuator is coupled to the spool 204, and thus is configured to rotate the spool 204 within the sleeve 202. In examples, the rotary actuator may be configured to rotate the spool 204 within the sleeve 202 in a clockwise or a counter-clockwise direction. Further, rotating the spool 204 to a given rotary position or angle may cause at least a partial alignment between the openings/windows/grooves of the spool 204 with the respective openings/windows/grooves of the sleeve 202. The respective openings/windows/grooves of the sleeve 202 are in turn aligned with respective channels and ports in the manifold 206.

Particularly, the spool 204 can assume a rotary position of at least eight different rotary positions within the sleeve 202. At each of the eight rotary positions, a subset of the plurality of openings (e.g., windows) in the spool 204 is aligned with a subset of the plurality of openings (holes, windows, etc.) in the sleeve 202, to connect: (i) the chamber C1 of the actuator 100 to either the high pressure fluid source 108 or the low pressure fluid reservoir 110, (ii) the chamber C2 of the actuator 100 to either the high pressure fluid source 108 or the low pressure fluid reservoir 110, and (iii) the chamber C3 of the actuator 100 to either the high pressure fluid source 108 or the low pressure fluid reservoir 110.

Figure 4D:
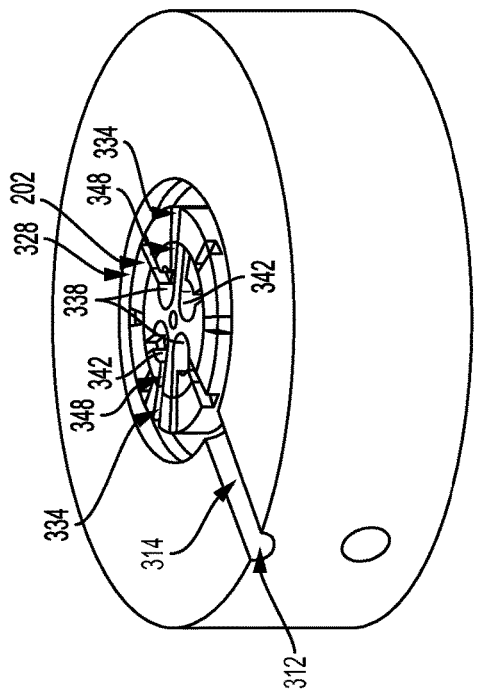

FIGS. 4A-4E illustrate cross sections of the rotary valve 200 at various levels or elevations while the spool 204 is at a particular rotary position, in accordance with an example implementation. At this particular rotary position of the spool 204, FIG. 4A depicts a cross section of the rotary valve 200 at a level showing that the port 300 is in fluid communication with the high pressure internal channels 338 by way of the channel 302, the annular groove 322, the openings 330, and the annular groove 336.

FIG. 4B depicts a cross section of the rotary valve 200 at a level showing that the chamber C1 is in fluid communication with the high pressure internal channels 338 while the spool 204 is at the particular rotary position. Particularly, the windows 344 are aligned with the windows 331 disposed in the annular groove 324 of the sleeve 202. Thus, the high pressure internal channels 338 are in fluid communication with the chamber C1 by way of the windows 344, the windows 331, the annular groove 324, the channel 306, and the port 304. As shown in FIG. 4B, the low pressure internal channels 342 are blocked because the subset of windows 344 that is in fluid communication with the low pressure internal channels 342 is blocked by the sleeve 202.

FIG. 4B illustrates the 1×1 interleaving configuration of the two low pressure internal channels 342 and the two high pressure internal channels 338. As shown in FIG. 4B, the two low pressure internal channels 342 are disposed opposite each other and the two high pressure internal channels 338 are disposed opposite each other.

Figure 4C:
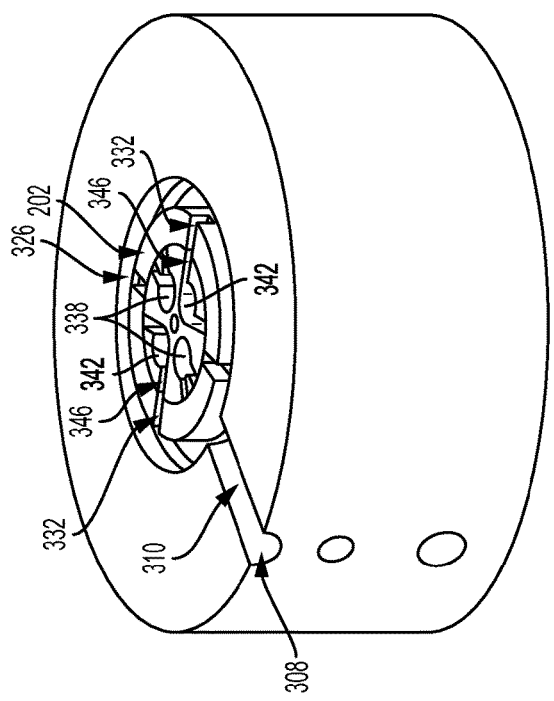

FIG. 4C depicts a cross section of the rotary valve 200 at a level showing that the chamber C2 is in fluid communication with the low pressure internal channels 342 while the spool 204 is at the particular rotary position. As shown in FIG. 4C, fluid in the high pressure internal channels 338 is blocked by the sleeve 202 and is thus not in fluid communication with the annular groove 326. However, at this rotary position of the spool 204, a subset of the windows 346 of the spool 204 is aligned with a subset of the windows 332 of the sleeve 202. Thus, the chamber C2 is in fluid communication with the low pressure internal channels 342 by way of the port 308, the channel 310, the annular groove 326, the windows 332, and the windows 346.

FIG. 4D depicts a cross section of the rotary valve 200 at a level showing that the chamber C3 is in fluid communication with the high pressure internal channels 338 while the spool 204 is at the particular rotary position. As shown in FIG. 4D, fluid in the low pressure internal channels 342 is blocked by the sleeve 202, and is thus not in fluid communication with the annular groove 328. However, at this rotary position of the spool 204, a subset of the windows 348 of the spool 204 is aligned with a subset of the windows 334 of the sleeve 202. Thus, the chamber C3 is in fluid communication with the high pressure internal channels 338 by way of the port 312, the channel 314, the annular groove 328, the windows 334, and the windows 348.

Thus, FIGS. 4A-4D illustrate the rotary valve 200 while the spool 204 is at a particular rotary position corresponding to the second entry of Table 1 above. At that particular spool rotary position, both chambers C1 and C3 are in fluid communication with high pressure fluid, while the chamber C2 is in fluid communication with low pressure fluid. The force applied on the piston 101 in this case is 75% of $F_{max}$, which is determined by equation (3) above.

Figure 4E:
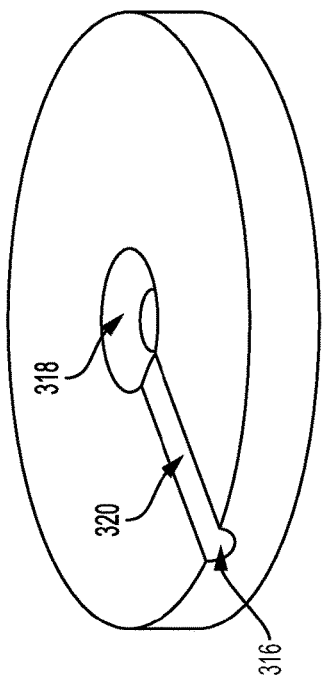

FIG. 4E illustrates that the low pressure chamber 318 is in fluid communication with the port 316 by way of the channel 320. Further, as mentioned above, the high pressure internal channels 338 are blocked at the bottom of the spool 204 by way of plugs 340. However, the low pressure internal channels 342 are not blocked at the bottom of the spool 204, and are in fluid communication with the low pressure chamber 318 through openings at the bottom or free end of the spool 204. The low pressure internal channels 342 are thus in fluid communication with the low pressure fluid reservoir 110 by way of the chamber 318, the channel 320, and the port 316. Such configuration is illustrated further below with respect to FIG. 5E.

Figure 5E:
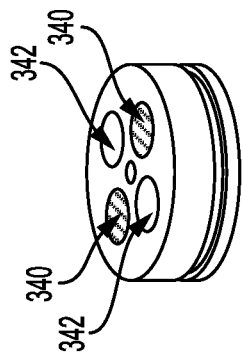
Figure 5D:
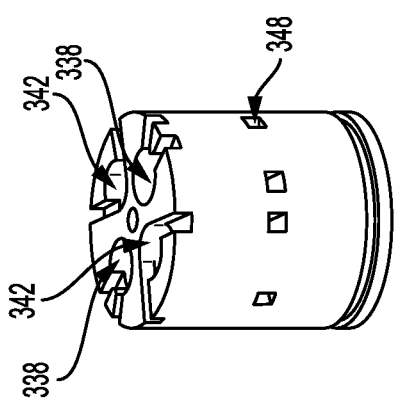

FIGS. 5A-5E illustrate cross sections of the spool 204 at various levels or elevations while the spool 204 is at a particular rotary position, in accordance with an example implementation. FIGS. 5A-5D depicts the high pressure internal channels 338, while FIG. 5E illustrates that at the bottom of the spool 204, the high pressure internal channels 338 are blocked by the plugs 340. However, the low pressure internal channels 342 are not blocked, and are configured to communicate fluid to and from the low pressure chamber 318 (not shown in FIG. 5E, but shown in FIGS. and 3A and 4E) through the free end of the spool 204.

FIGS. 6A-6H illustrate a schematic of the spool 204 at eight different rotary positions, in accordance with an example implementation. The eight different rotary positions in FIGS. 6A-6H correspond to the eight entries of Table 1. FIGS. 6A-6H depict the spool 204 as if the spool 204 was unwrapped along a longitudinal axis 350 (shown also in FIGS. 3C, 4A, and 5A) to obtain a planar view. Thus, in FIGS. 6A-6H, the first row of rectangular windows represents the windows 344, the second row of rectangular windows represents the windows 346, and the third row of rectangular windows represents the windows 348.

In FIGS. 6A-6H, spool windows that are referenced have a thick-lined boundary to indicate that they are aligned with a respective sleeve window. Thus, the thick-lined boundaries around respective referenced spool windows in FIG. 6A-6H represent sleeve windows aligned with the respective referenced spool windows.

Also, in FIGS. 6A-6H, windows that have a cross-hatching fill pattern indicate that such windows are in fluid communication with the high pressure internal channels 338. The high pressure internal channels 338 contain high pressure fluid because they are in fluid communication with the high pressure fluid source 108 by way of the port 300, the channel 302, the annular groove 322, the openings 330, and the annular groove 336 as described above with respect to FIGS. 3A-5E.

Windows that have a dotted filling pattern indicated that such windows are in fluid communication with the low pressure internal channels 342. The low pressure internal channels 342 contain low pressure fluid because they are in fluid communication with the low pressure fluid reservoir 110 by way of the low pressure chamber 318, the channel 320, and the port 316 as described above with respect to FIGS. 3A-5E. Windows that do not have a fill pattern are neither in fluid communication with the high pressure internal channels 338 nor with the low pressure internal channels 342.

In the examples described in FIGS. 6A-6H, fluid pressure (Plo) in the low pressure fluid reservoir 110 is assumed to be ≅0, and the piston surface areas $A_1$, $A_2$, and $A_3$ are assumed to be $A_1=4A$, $A_2=2A$, and $A_3=A$, wherein A is a given area, as examples for illustration only. As depicted in FIGS. 6A-6H, the windows 344 are larger in size than the windows 346 and the windows 348 because the area $A_1$ is larger than the area $A_2$ and larger than the area $A_3$.

FIG. 6A represents the spool 204 at a first rotary position. In FIG. 6A, window 600 and window 602, which are a subset of the windows 344, are in fluid communication with the high pressure internal channels 338. Further, the windows 600 and 602 are aligned with respective windows of the windows 331 (represented by thick-lined boundaries around the windows 600 and 602) disposed in the annular groove 324 of the sleeve 202. Thus, the high pressure internal channels 338 are in fluid communication with the chamber C1 by way of the windows 600 and 602, the respective windows from the windows 331, the annular groove 324 of the sleeve 202, the channel 306, and the port 304 (see FIG. 4B).

Also, at this first rotary position of the spool 204, window 604 and window 606, which are a subset of the windows 346, are in fluid communication with the low pressure internal channels 342 that contain low pressure fluid. Further, the windows 604 and 606 are aligned with respective windows of the windows 332 (represented by thick-lined boundaries around the windows 604 and 606) disposed in the annular groove 326 of the sleeve 202. Thus, the chamber C2 is in fluid communication with the low pressure internal channels 342 by way of the port 308, the channel 310, the annular groove 326, the windows 332, and the windows 604 and 606.

Further, at this first rotary position of the spool 204, windows 607, 608, 609, and 610, which are a subset of the windows 348, are in fluid communication with the low pressure internal channels 342. The windows 607, 608, 609, and 610 are aligned with respective windows of the windows 334 (represented by thick-lined boundaries around the windows 607, 608, 609, and 610) disposed in the annular groove 328 of the sleeve 202. Thus, the chamber C3 is in fluid communication with the low pressure internal channels 342 by way of the port 312, the channel 314, the annular groove 328, the windows 334, and the windows 607, 608, 609, and 610.

In this manner, the force that the piston 101 exerts when the spool 204 is at the first rotary position represented in FIG. 6A can be determined as:

$$F_1=F_{max}=\text{Phi}\times 4A-\text{Plo}\times 2A-\text{Plo}\times A=4A\text{Phi} \quad (4)$$

which is 100% of the maximum force (see Table 1 and equation (3)).

FIG. 6B represents the spool 204 at a second rotary position. In FIG. 6B, window 612 and window 614, which are a subset of the windows 344, are in fluid communication with the high pressure internal channels 338 that contain high pressure fluid. Further, the windows 612 and 614 are aligned with a respective subset of the windows 331 disposed in the annular groove 324 of the sleeve 202. Thus, the high pressure internal channels 338 are in fluid communication with the chamber C1 by way of the windows 612 and 614, the respective subset of windows of the windows 331, the annular groove 324 of the sleeve 202, the channel 306, and the port 304.

Also, at this second rotary position of the spool 204, window 616 and window 618, which are a subset of the windows 346, are in fluid communication with the low pressure internal channels 342. Further, the windows 616 and 618 are aligned with a respective subset of the windows 332 disposed in the annular groove 326 of the sleeve 202. Thus, the chamber C2 is in fluid communication with the low pressure internal channels 342 by way of the port 308, the channel 310, the annular groove 326, the windows 332, and the windows 616 and 618.

Further, at this second rotary position of the spool 204, windows 620, 622, 624, and 626, which are a subset of the windows 348, are in fluid communication with the high pressure internal channels 338. The windows 620, 622, 624, and 626 are aligned with a respective subset of the windows 334 disposed in the annular groove 328 of the sleeve 202. Thus, the high pressure internal chambers 338 are in fluid communication with the chamber C3 by way of the windows 620, 622, 624, and 626, the respective subset of windows of the windows 334, the annular groove 328 of the sleeve 202, the channel 314, and the port 312.

In this manner, the force that the piston 101 exerts when the spool 204 is at this second rotary position represented in FIG. 6B can be determined as:

$$F_2 = \text{Phi} \times 4A - \text{Plo} \times 2A - \text{Phi} \times A = 3A\text{Phi} \quad (5)$$

which is 75% of the maximum force.

FIG. 6C represents the spool 204 at a third rotary position. In FIG. 6C, window 628 and window 630, which are a subset of the windows 344, are in fluid communication with the high pressure internal channels 338. Further, the windows 628 and 630 are aligned with a respective subset of the windows 331 disposed in the annular groove 324 of the sleeve 202. Thus, high pressure internal channels 338 are in fluid communication with the chamber C1 by way of the windows 628 and 630, the respective subset of windows of the windows 331, the annular groove 324 of the sleeve 202, the channel 306, and the port 304.

Also, at this third rotary position of the spool 204, window 632, which is a subset of the windows 346, is in fluid communication with the high pressure internal channels 338. Further, the window 632 is aligned with a respective window of the windows 332 disposed in the annular groove 326 of the sleeve 202. Thus, high pressure internal channels 338 are in fluid communication with the chamber C2 by way of the window 632, the respective window of the windows 332, the annular groove 326 of the sleeve 202, the channel 310, and the port 308.

Further, at this third rotary position of the spool 204, windows 634, 636, 638, and 640, which are a subset of the windows 348, are in fluid communication with the low pressure internal channels 342. The windows 634, 636, 638, and 640 are further aligned with a respective subset of the windows 334 disposed in the annular groove 328 of the sleeve 202. Thus, the chamber C3 is in fluid communication with the low pressure internal channels 342 by way of the port 312, the channel 314, the annular groove 328, the windows 334, and the windows 634, 636, 638, and 640.

In this manner, the force that the piston 101 exerts when the spool 204 is at this third rotary position represented in FIG. 6C can be determined as:

$$F_3 = \text{Phi} \times 4A - \text{Phi} \times 2A - \text{Plo} \times A = 2A\text{Phi} \quad (6)$$

which is 50% of the maximum force.

FIG. 6D represents the spool 204 at a fourth rotary position. In FIG. 6D, window 642 and window 644, which are a subset of the windows 344, are in fluid communication with the high pressure internal channels 338. Further, the windows 642 and 644 are aligned with a respective subset of the windows 331 disposed in the annular groove 324 of the sleeve 202. Thus, the high pressure internal channels 338 are in fluid communication with the chamber C1 by way of the windows 642 and 644, the respective subset of windows of the windows 331, the annular groove 324 of the sleeve 202, the channel 306, and the port 304.

Also, at this fourth rotary position of the spool 204, window 646, which is a subset of the windows 346, is in fluid communication with the high pressure internal channels 338. Further, the window 646 is aligned with a respective window of the windows 332 disposed in the annular groove 326 of the sleeve 202. Thus, the high pressure internal channels 338 are in fluid communication with the chamber C2 by way of the window 646, the respective window of the windows 332, the annular groove 326 of the sleeve 202, the channel 310, and the port 308.

Further, at this fourth rotary position of the spool 204, windows 648, 650, and 652, which are a subset of the windows 348, are also in fluid communication with the high pressure internal channels 338. The windows 648, 650, and 652 are further aligned with a respective subset of the windows 334 disposed in the annular groove 328 of the sleeve 202. Thus, the high pressure internal channels 338 are in fluid communication with the chamber C3 by way of the windows 648, 650, and 652, the respective window of the windows 334, the annular groove 328 of the sleeve 202, the channel 314, and the port 312.

In this manner, the force that the piston 101 exerts when the spool 204 is at this fourth rotary position represented in FIG. 6D can be determined as:

$$F_4 = \text{Phi} \times 4A - \text{Phi} \times 2A - \text{Phi} \times A = A\text{Phi} \quad (7)$$

which is 25% of the maximum force.

FIG. 6E represents the spool 204 at a fifth rotary position. In FIG. 6E, window 654 and window 656, which are a subset of the windows 344, are in fluid communication with the low pressure internal channels 342. Further, the windows 654 and 656 are aligned with a respective subset of the windows 331 disposed in the annular groove 324 of the sleeve 202. Thus, the chamber C1 is in fluid communication with the low pressure internal channels 342 by way of the port 304, the channel 306, the annular groove 324, the respective subset of the windows 331, and the windows 654 and 656.

Also, at this fifth rotary position of the spool 204, window 658 and window 660, which are a subset of the windows 346, are in fluid communication with the low pressure internal channels 342. Further, the windows 658 and 660 are aligned with respective windows of the windows 332 disposed in the annular groove 326 of the sleeve 202. Thus, the chamber C2 is in fluid communication with the low pressure internal channels 342 by way of the port 308, the channel 310, the annular groove 326, the respective subset of the windows 332, and the windows 658 and 660.

Further, at this fifth rotary position of the spool 204, windows 662, 664, 666, and 668, which are a subset of the windows 348, are also in fluid communication with the low pressure internal channels 342. The windows 662, 664, 666, and 668, are aligned with a respective subset of the windows 334 disposed in the annular groove 328 of the sleeve 202. Thus, the chamber C3 is also in fluid communication with the low pressure internal channels 342 by way of the port 312, the channel 314, the annular groove 328, the respective subset of the windows 334, and the windows 662, 664, 666, and 668.

In this manner, the force that the piston 101 exerts when the spool 204 is at this fifth rotary position represented in FIG. 6E can be determined as:

$$F_5 = P \text{lox} 4A - P \text{lox} 2A - P \text{lox} A = A P \text{lo} = 0 \quad (8)$$

which is 0% of the maximum force.

FIG. 6F represents the spool 204 at a sixth rotary position. In FIG. 6F, window 670 and window 672, which are a subset of the windows 344, are in fluid communication with the low pressure internal channels 342. Further, the windows 670 and 672 are aligned with a respective subset of the windows 331 disposed in the annular groove 324 of the sleeve 202. Thus, the chamber C1 is in fluid communication with the low pressure internal channels 342 by way of the port 304, the channel 306, the annular groove 324, the respective subset of the windows 331, and the windows 670 and 672.

Also, at this sixth rotary position of the spool 204, window 674, which is a subset of the windows 346, is in fluid communication with the low pressure internal channels 342. Further, the window 674 is aligned with a respective window of the windows 332 disposed in the annular groove 326 of the sleeve 202. Thus, the chamber C2 is in fluid communication with the low pressure internal channel 342 by way of the port 308, the channel 310, the annular groove 326, the respective window of the windows 332, and the windows 674.

Further, at this sixth rotary position of the spool 204, window 676 and window 678, which are a subset of the windows 348, are in fluid communication with the high pressure internal channels 338. The windows 676 and 678 are aligned with a respective subset of the windows 334 disposed in the annular groove 328 of the sleeve 202. Thus, high pressure internal channels 338 are in fluid communication with the chamber C3 by way of the windows 676 and 678, the respective subset of windows of the windows 334, the annular groove 328 of the sleeve 202, the channel 314, and the port 312.

In this manner, the force that the piston 101 exerts when the spool 204 is at this sixth rotary position represented in FIG. 6F can be determined as:

$$F_6 = P \text{lox} 4A - P \text{lox} 2A - P \text{hix} A = -A P \text{hi} \quad (9)$$

which is −25% of the maximum force. The "−" indicates that the force is a pulling force as opposed to a pushing force.

Figure 6G:
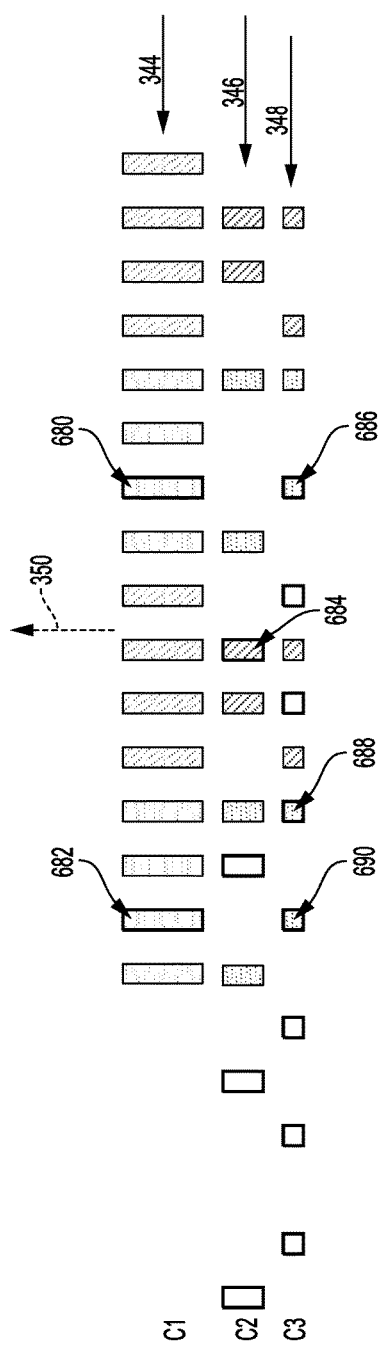

FIG. 6G represents the spool 204 at a seventh rotary position. In FIG. 6G, window 680 and window 682, which are a subset of the windows 344, are in fluid communication with the low pressure internal channels 342. Further, the windows 680 and 682 are aligned with a respective subset of the windows 331 disposed in the annular groove 324 of the sleeve 202. Thus, the chamber C1 is in fluid communication with the low pressure internal channels 342 by way of the port 304, the channel 306, the annular groove 324, the respective subset of the windows 331, and the windows 680 and 682.

Also, at this seventh rotary position of the spool 204, window 684, which is a subset of the windows 346, is in fluid communication with the high pressure internal channels 338. Further, the window 684 is aligned with a respective window of the windows 332 disposed in the annular groove 326 of the sleeve 202. Thus, high pressure internal channels 338 are in fluid communication with the chamber C2 by way of the window 684, the respective window of the windows 332, the annular groove 326 of the sleeve 202, the channel 310, and the port 308.

Further, at this seventh rotary position of the spool 204, windows 686, 688, and 690, which are a subset of the windows 348, are in fluid communication with the low pressure internal channels 342. The windows 686, 688, and 690 are aligned with a respective subset of the windows 334 disposed in the annular groove 328 of the sleeve 202. Thus, the chamber C3 is in fluid communication with the low pressure internal channels 342 by way of the port 312, the channel 314, the annular groove 328, the respective subset of windows of the windows 332, and the windows 686, 688, and 690.

In this manner, the force that the piston 101 exerts when the spool 204 is at this sixth rotary position represented in FIG. 6F can be determined as:

$$F_7 = P \text{lox} 4A - P \text{hix} 2A - P \text{lox} A = -2A P \text{hi} \quad (10)$$

which is −50% of the maximum force.

Figure 6H:
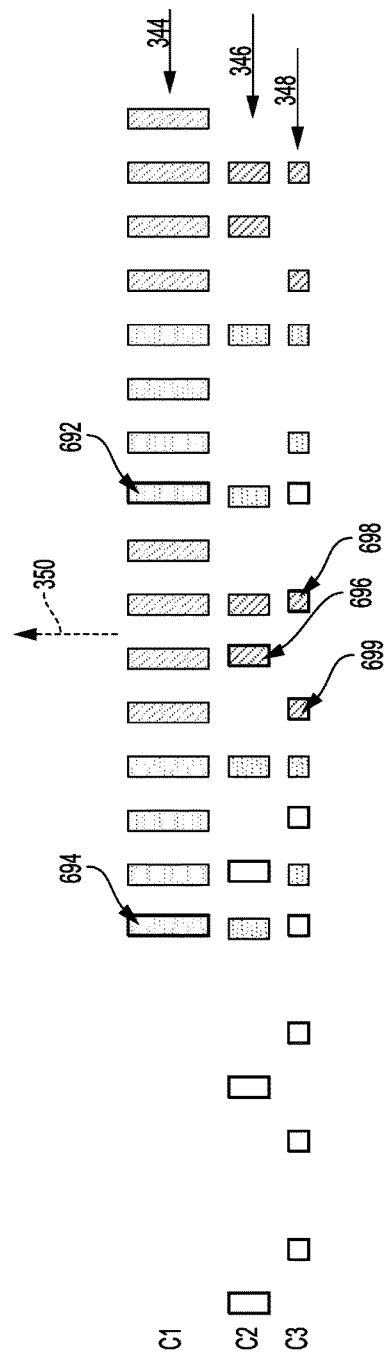

FIG. 6H represents the spool 204 at an eighth rotary position. In FIG. 6H, window 692 and window 694, which are a subset of the windows 344, are in fluid communication with the low pressure internal channels 342. Further, the windows 692 and 694 are aligned with a respective subset of the windows 331 disposed in the annular groove 324 of the sleeve 202. Thus, the chamber C1 is in fluid communication with the low pressure internal channels 342 by way of the port 304, the channel 306, the annular groove 324, the respective subset of the windows 331, and the windows 692 and 694.

Also, at this eighth rotary position of the spool 204, window 696, which is a subset of the windows 346, is in fluid communication with the high pressure internal channels 338. Further, the window 696 is aligned with a respective window of the windows 332 disposed in the annular groove 326 of the sleeve 202. Thus, high pressure internal channels 338 are in fluid communication with the chamber C2 by way of the window 696, the respective window of the windows 332, the annular groove 326 of the sleeve 202, the channel 310, and the port 308.

Further, at this eighth rotary position of the spool 204, windows 698 and 699, which are a subset of the windows 348, are in fluid communication with the low pressure internal channels 342. The windows 698 and 699 are aligned with a respective subset of the windows 334 disposed in the annular groove 328 of the sleeve 202. Thus, high pressure internal channels 338 are in fluid communication with the chamber C3 by way of the windows 698 and 699, the respective subset of windows of the windows 334, the annular groove 328 of the sleeve 202, the channel 314, and the port 312.

In this manner, the force that the piston 101 exerts when the spool 204 is at this sixth rotary position represented in FIG. 6F can be determined as:

$$F_8 = P \text{lox} 4A - P \text{hix} 2A - P \text{hix} A = -3A P \text{hi} \quad (11)$$

which is −75% of the maximum force.

Thus, as described with respect to FIGS. 6A-6H, the rotary valve 200 enables 360° rotation of the spool 204 to any given rotary position to selectively align a subset of openings of the openings (e.g., axial grooves, windows, etc.) of the spool 204 with a subset of openings (e.g., axial grooves, windows, etc.) of the sleeve 202. The spool 204 may be configured to rotate either clockwise or counter-clockwise to reach a particular rotary position. Based on the rotary position of the spool 204 and which openings are aligned, the actuator 100 may operate in a particular mode (e.g., extend or retract while applying a particular force level).

In the configuration of the actuator 100 illustrated in FIG. 1, and referenced in FIGS. 2-6H, fluid in the chamber C1 acts on the piston 101 in a direction opposite to direction of action of fluid in the chambers C2 and C3. This configuration is an example for illustration only. A three-chamber actuator can be configured for various levels of force to best suit an application. For example, in a lifting application where the piston of the actuator may be configured to lift objects against gravity, the actuator may be configured such that all three chambers act in one direction to lift the object. In another example where a robotic arm swinging back and forth, a more balanced force range might be desirable. In this example, the actuator may be configured like the actuator 100. Other configurations are possible depending on the application.

Based on the actuator configuration, configuration of the rotary valve 200 may be changed slightly. For instance, in the example where all three chambers are acting in one direction, a small shift in angular position of the C2 and C3 ports 308 and 312 on the manifold 206 may suffice to accommodate the change in actuator configuration. However, configuration (e.g., windows layout) of the spool 204 may stay the same. In this example configuration, the actuator is capable of achieving 8 force levels from 100% to 0%. Specifically, assuming pressure level (Plo) in the low pressure fluid reservoir 110≅0, and $A_1=4A$, $A_2=2A$, and $A_3=A$, the force levels may be approximately: 100%, 86%, 71%, 57%, 43%, 29%, 14%, and 0% of the maximum force of:

$$F_{max}=\text{Phi}\times 4A+\text{Phi}\times 2A+\text{Phi}\times A=7A\text{Phi} \quad (12)$$

Further, in describing FIGS. 6A-6H, fluid pressure level (Plo) in the low pressure fluid reservoir 110 was assumed to be zero. This assumption resulted in a force range of +100% to −75%, e.g., the ability to push with 100 pound force (lb) and pull with 75 lb. In other examples, (Plo) may be elevated to a slightly higher pressure level to avoid cavitation (i.e., pressure dropping to below zero) when a chamber connected to the low pressure fluid reservoir 110 is expanding. This change in (Plo) affects the available force levels as shown in FIG. 7.

FIG. 7 illustrates variation of force level with different spool rotary positions, in accordance with an example implementation. FIG. 7 illustrates that angular distance between any two consecutive rotary positions is the same. However, other rotary position arrangements are possible.

As shown in the FIG. 7, if (Plo) is ⅟30th of (Phi) (the pressure in the high pressure fluid source 108), the force levels range from 100% to −73.5% in increments of about 24.8%. If (Plo) is ⅕th of (Phi), the force levels range from 100% to −64.7% in increments of about 23.5%. However, the force levels remain evenly spaced even when (Plo) is elevated.

FIG. 7 also illustrates that the rotary valve 200 is capable of a "wrap-around" mode where the actuator force changes from ≅−75% to 100% upon a slight spool rotation from 157.5° to 180°. This mode could be useful for applications involving high-bandwidth force control because a large change in force can be achieved with slight spool rotation.

III. EXAMPLE ANTI-CAVITATION AND OVER PRESSURIZATION

In examples, a controller of a hydraulic system may command the spool 204 to rotate (by way of a rotary actuator) to a particular rotary position. The controller may be a computing device comprising one or more processors configured to execute program instructions stored in the computing device (e.g., a memory within the computing device), for example. At the particular rotary position, openings (e.g., windows) of the spool 204 may be partially aligned with respective openings/windows of the sleeve 202.

Such partial alignment allows the rotary valve 200 to control amount of flow, i.e., meter, fluid passing through aligned openings of the spool 204 and the sleeve 202. By metering the fluid, motion of the actuator 100 (speed, force, etc.) could be controlled. For instance, a controller, which may be included in the rotary valve 200 or remote from the rotary valve 200, may receive a command to move the piston 101 at a given speed in a given direction. The controller, in response, may provide a signal to the rotary actuator to rotate the spool 204 to a given position to meter fluid to and from the chambers C1, C2, and C3 of the actuator 100. Metering the fluid to and from the chambers C1, C2, and C3 results in controlling speed and direction of motion of the piston 101.

Figure 8A:
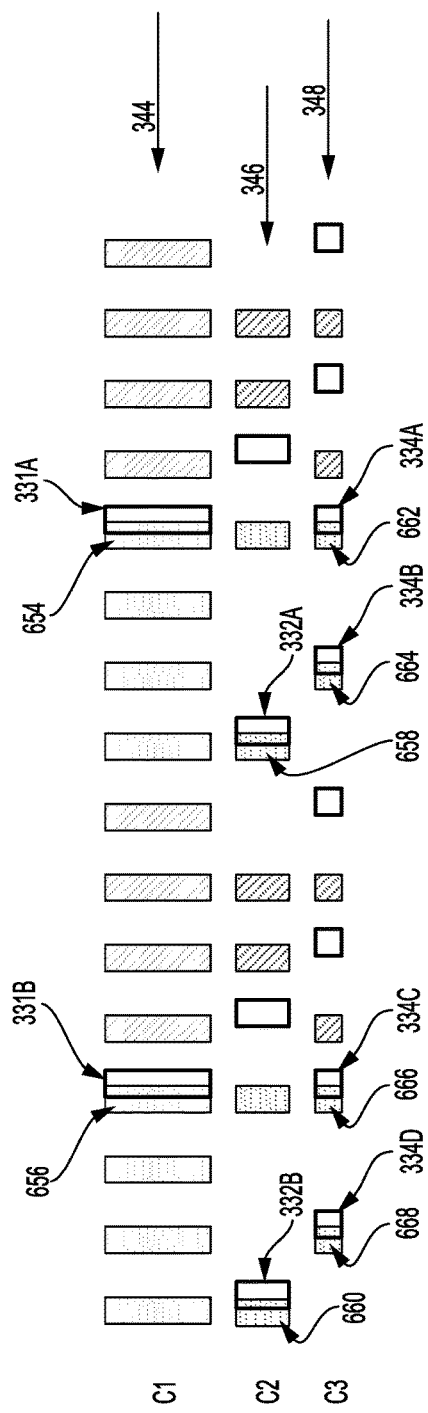
FIG. 8A illustrates partial alignment between openings in the spool and respective openings in the sleeve, in accordance with an example implementation.

FIG. 8A illustrates partial alignment between openings in the spool 204 and respective openings in the sleeve 202, in accordance with an example implementation. FIG. 8A illustrates a mode similar to the mode illustrated in FIG. 6E where all three chambers C1, C2, and C3 are in fluid communication with the low pressure fluid reservoir 110. However, FIG. 8A illustrates that the windows 654 and 656, which are a subset of the windows 344 in the spool 204, are partially aligned with respective windows 331A and 331B. The windows 331A and 331B are a subset of the windows 331 disposed in the annular groove 324 of the sleeve 202.

Similarly, the windows 658 and 660, which are a subset of the windows 346 in the spool 204, are partially aligned with respective windows 332A and 332B. The windows 332A and 332B are a subset of the windows 332 disposed in the annular groove 326 of the sleeve 202. Also, the windows 662, 664, 666, and 668, which are a subset of the windows 348 in the spool 204, are partially aligned with respective windows 334A, 334B, 334C, and 334D. The windows 334A, 334B, 334C, and 334D are a subset of the windows 334 disposed in the annular groove 328 of the sleeve 202.

The partial alignments between openings in the spool 204 and respective openings in the sleeve 202 allow for controlling or metering fluid to control speed of the piston 101. In these partial alignment examples, anti-cavitation valves may be added to the hydraulic system to prevent pressure from dropping below zero in one or more chambers of the actuator 100.

Figure 8B:
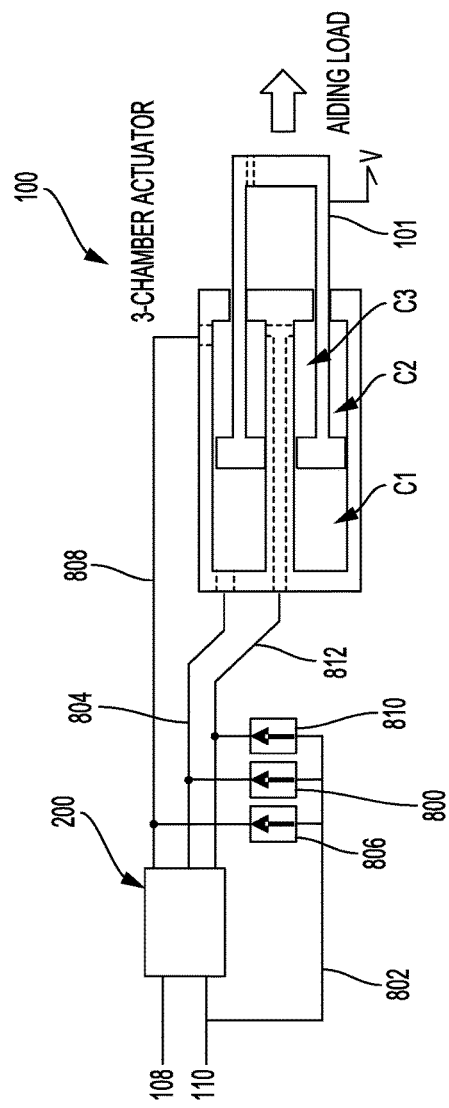
FIG. 8B illustrates use of anti-cavitation valves, in accordance with an example implementation.

FIG. 8B illustrates use of anti-cavitation valves, in accordance with an example implementation. As shown in FIG. 8B, a check valve 800 connects a hydraulic line 802, which is in fluid communication with the low pressure fluid reservoir 110, to a hydraulic line 804, which conducts fluid between the rotary valve 200 and the chamber C1 of the actuator 100. Similarly, a check valve 806 connects the hydraulic line 802 to a hydraulic line 808, which conducts fluid between the rotary valve 200 and the chamber C2 of the actuator 100. Further, a check valve 810 connects the hydraulic line 802 to a hydraulic line 812, which conducts fluid between the rotary valve 200 and the chamber C3 of the actuator 100.

To illustrate operation of the check valves 800, 806, and 810, assume that the piston 101 is extending (i.e., moving to the right in FIG. 8B) at a speed (V) under an aiding load that acts in the same direction of motion. For example, the piston 101 may be moving a load while being assisted by gravity.

In this example, high pressure fluid from the high pressure fluid source 108 may not be required to move the load. Particularly, the controller of the hydraulic system may command the spool 204 to move to a rotary position that connects all three chambers C1, C2, and C3 to the low pressure fluid reservoir 110. In this example, as the load moves, pressure may rise in the chambers C2 and C3, but may drop in the chamber C1. To prevent the chamber C1 from cavitating, the check valve 800 may allow fluid to be withdrawn from the low pressure fluid reservoir 110 through the hydraulic line 802. Such fluid may then pass through the check valve 800 and the hydraulic line 804 to help filling the chamber C1 with hydraulic fluid and prevent cavitation.

Similarly, if the piston 101 was forced to retract (i.e., move left in FIG. 8B), such as in a case where the piston 101 is lowering a weight with gravity assistance, fluid pressure may drop in the chambers C2 and C3 and possibly cause cavitation in these chambers. To prevent cavitation, the check valve 806 may help filling the chamber C2 by delivering fluid withdrawn from the low pressure fluid reservoir 110 through the hydraulic line 802 to the chamber C2 by way of the hydraulic line 808. Similarly, the check valve 810 may help filling the chamber C3 by delivering fluid withdrawn from the low pressure fluid reservoir 110 through the hydraulic line 802 to the chamber C3 by way of the hydraulic line 812.

Although FIG. 8B illustrates three check valves, only a subset of the check valves may be used. For example, if one of the chambers C1, C2, and C3 is most likely to be subject to cavitation, only the check valve associated with that chamber may be added.

In other examples, the controller may command the spool 204 to move to a rotary position that is not appropriate for a particular loading and motion conditions, and may thus cause over pressurization in one or more chambers of the actuator 100. For example, assume that the piston 101 is forced to extend under a large aiding load. Also, assume that the spool 204 is commanded to rotate to a particular rotary position where the chambers C1 and C2 are connected to the low pressure fluid reservoir 100, while the chamber C3 is connected to the high pressure fluid source 108. In this case, fluid pressure in the chamber C3 may rise to undesirable levels.

Figure 9A:
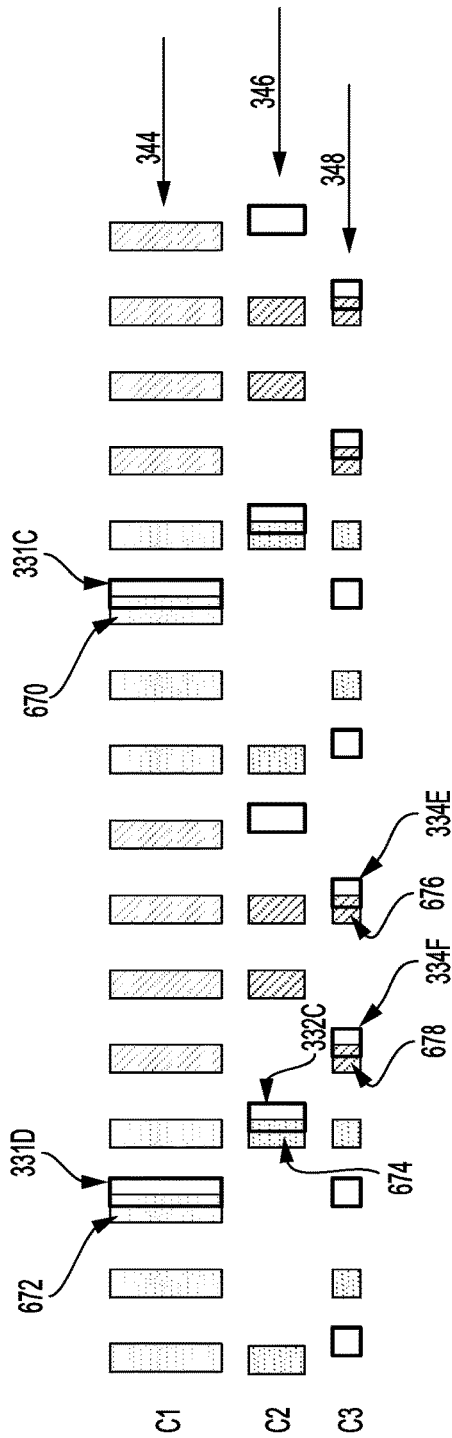
FIG. 9A illustrates a partial alignment configuration between openings in the spool and respective openings in the sleeve that might cause over pressurization, in accordance with an example implementation.

FIG. 9A illustrates a partial alignment configuration between openings in the spool 204 and respective openings in the sleeve 202 that might cause over pressurization, in accordance with an example implementation. FIG. 9A illustrates a mode similar to the mode illustrated in FIG. 6F where the chambers C1 and C2 are in fluid communication with the low pressure fluid reservoir 110, while the chamber C3 is in fluid communication with the high pressure fluid source 108. However, FIG. 9A illustrates partial alignment between the windows/openings of the spool 204 and the respective windows/openings of the sleeve 202. For instance, the spool windows 670 and 672 are partially aligned with respective sleeve windows 331C and 331D. Further, the spool window 674 is partially aligned with respective sleeve window 332C, and the spool windows 676 and 678 are partially aligned with respective sleeve windows 334E and 334F. Other windows from the windows 348 are partially aligned with respective windows in the sleeve 202, but the windows 676 and 678 are used as examples for illustration.

In this case, the partial alignments between openings in the spool 204 and respective openings in the sleeve 202 allow for controlling or metering fluid but may cause pressure in the chamber C3 to rise to an undesirable pressure level. Specifically, flow of fluid discharged from the chamber C3 can be computed by the following equation:

$$\text{Flow}(Q) = K\sqrt{P_{C3} - \text{Phi}} \quad (13)$$

where Q is flow through an opening defined by overlap between a subset of the spool windows 348 (e.g., the windows 676 and 678) and a respective subset of the sleeve windows 334 (e.g., the windows 334E and 334F). K is a variable that depends on a size of the overlap (e.g., a size of a given opening defined by overlapping areas of two respective openings). $P_{C3}$ is fluid pressure of fluid in the chamber C3, and (Phi) is fluid pressure in the high pressure fluid source 108. Thus, the pressure $P_{C3}$ can be computed as:

$$P_{C3} = \frac{Q^2}{K^2} + Phi \quad (14)$$

Consequently, pressure level $P_{C3}$ in the chamber C3 exceeds Phi by $$\frac{Q^2}{K^2},$$

which might be undesirable if $P_{C3}$ exceeds a particular pressure threshold.

To alleviate this problem, the controller may be configured to monitor pressure levels in the chambers C1, C2, and C3 to select a more appropriate (e.g., safer) mode of operation. For instance, the controller may select a mode that involves a least amount of "damping" or metering to achieve the desired force. For instance, in the example where the piston 101 is extending at speed (676 and 678 are) while aided by a large load, the controller may connect the chambers C1 and C3 to the low pressure fluid reservoir 110 and connect the chamber C2 to the high pressure fluid source 108. Alternatively, the controller may connect the chambers C2 and C3 to the high pressure fluid source 108 and connect the chamber C1 to the low pressure fluid reservoir 110. These modes of operation may be safer as fluid may be directed or regenerated back to the high pressure fluid source 108 and prevent over pressurization of any of the chambers.

Figure 9B:
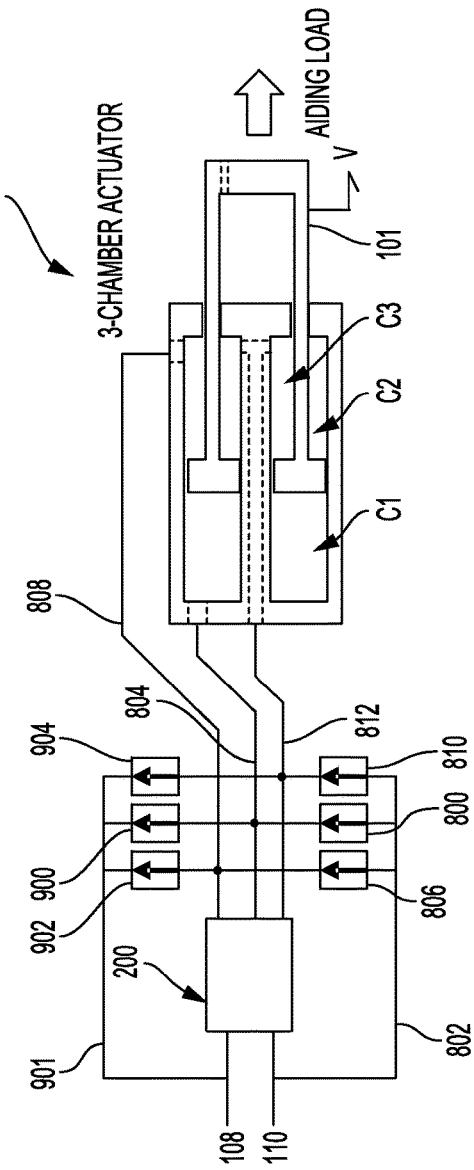
FIG. 9B illustrates check valves connecting actuator chambers to a high pressure fluid source, in accordance with an example implementation.

Another way to alleviate over pressurization involves adding check valves to connect one or more of the chambers C1, C2, and C3 to the high pressure fluid source 108. FIG. 9B illustrates check valves connecting actuator chambers to the high pressure fluid source 108, in accordance with an example implementation. As shown in FIG. 9B, a check valve 900 connects the hydraulic line 804, which communicates fluid to and from the chamber C1 of the actuator 100, to the high pressure fluid source 108 by way of hydraulic line 901. Similarly, a check valve 902 connects the hydraulic line 808, which communicates fluid to and from the chamber C2, to the high pressure fluid source 108 by way of hydraulic line 901. Further, a check valve 904 connects hydraulic line 812, which communicates fluid to and from the chamber C3, to the high pressure fluid source 108 by way of hydraulic line 901.

The check valves 900, 902, and 904 may protect the chambers C1, C2, and C3, respectively, from over pressurization. For instance, in the example where the piston 101 is extending while aided by a large load, pressure in the chamber C3 may rise beyond a particular threshold pressure. To relieve the pressure in the chamber C3, fluid discharged from the chamber C3 through the hydraulic line 812 may be regenerated back to the high pressure fluid source 108 by way of the check valve 904 and the hydraulic line 901. Thus, pressure in the chamber C3 is relieved and may not be allowed to rise to undesirable levels.

In the configuration shown in FIG. 9B, the chamber C3 may be subject to the highest over pressurization because area of the piston 101 in the chamber C3 is the smallest compared to the chambers C1 and C3. Therefore, the chamber C3 may benefit most from adding a check valve such as the check valve 904. Thus, in some examples, only a subset of the check valves 900, 902, and 904 may be added to the system.

In example implementations, preventing cavitation may be accomplished without using check valves. Specifically, sizes of windows of the sleeve 202 may be reduced and shifted or offset to alleviate cavitation.

Figure 10A:
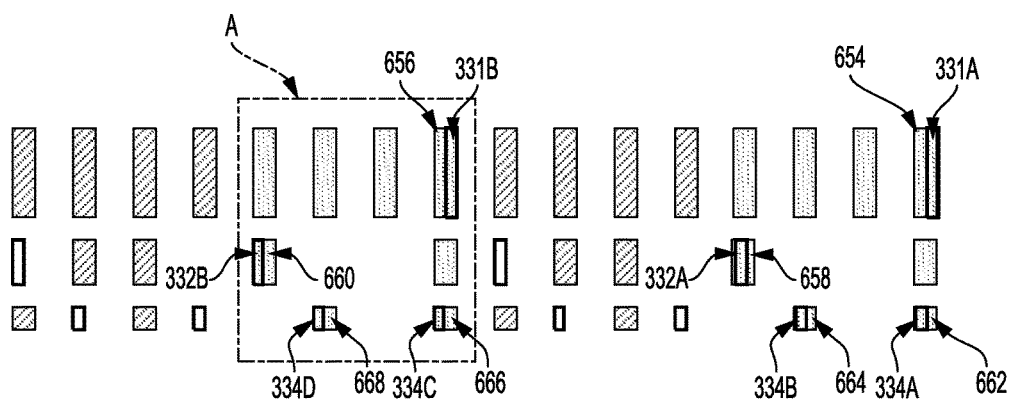
FIG. 10A illustrates partial alignment between openings in the spool and respective openings in the sleeve, with openings of the sleeve being shifted, in accordance with an example implementation.

FIG. 10A illustrates partial alignment between openings in the spool 204 and respective openings in the sleeve 202, with openings of the sleeve 202 being shifted, in accordance with an example implementation. FIG. 10A illustrates a mode similar to the mode illustrated in FIG. 8A where all three chambers C1, C2, and C3 are in fluid communication with the low pressure fluid reservoir 110. However, comparing FIG. 10A with FIG. 8A shows that the windows of the sleeve 202 are reduced in size and shifted. For instance, the sleeve windows 331A, 331B, 332A, 332B, 334A, 334B, 334C, and 334D are depicted in FIG. 10A having smaller size and shifted compared to their respective depiction in FIG. 8A.

Figure 10B:
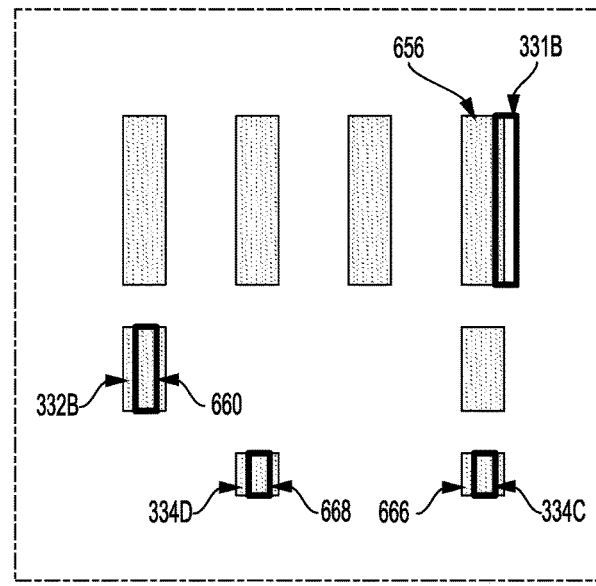
FIG. 10B illustrates metering diagram while a piston is retracting with load assistance, in accordance with an example implementation.
Figure 10C:
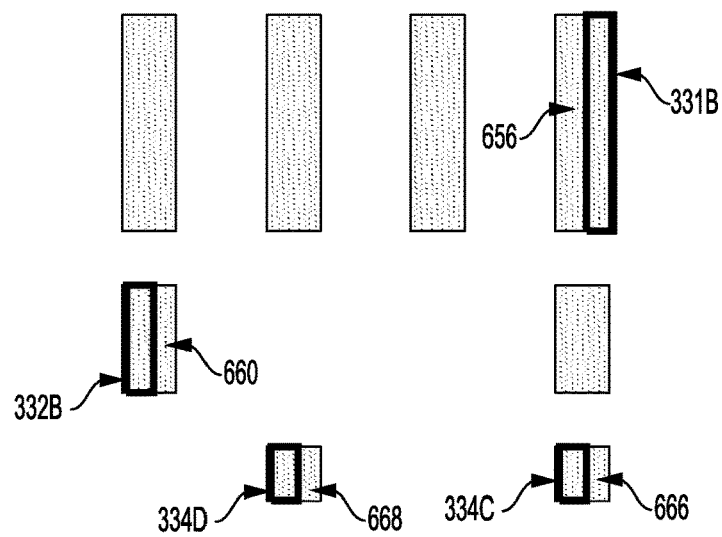
FIG. 10C illustrates alignment of windows while the actuator is in coasting mode, in accordance with an example implementation.
Figure 10D:
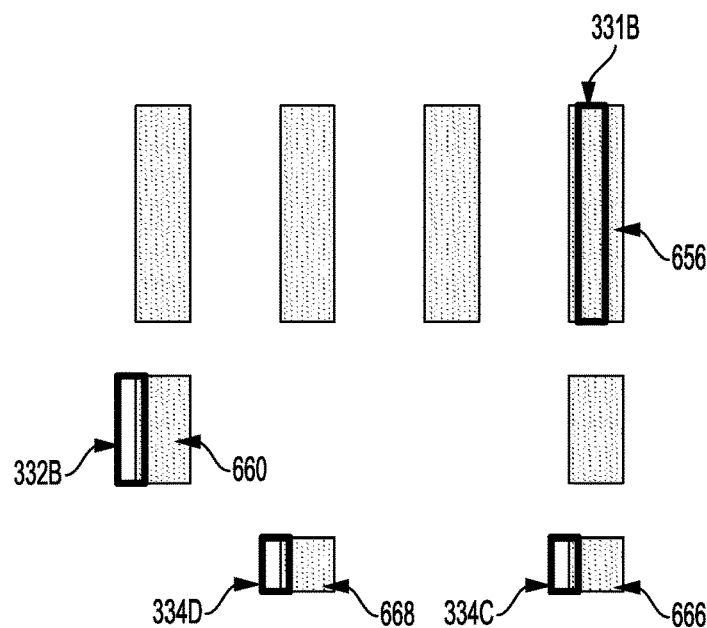
FIG. 10D illustrates alignment of windows while the actuator is extending with load assistance, in accordance with an example implementation.

Particularly, the sleeve windows 331A and 331B associated with the chamber C1 are shifted to the right, while the windows 332A and 332B associated with the chamber C2 and the windows 334A, 334B, 334C, and 334D associated with the chamber C3 are shifted left. Such shifting and reduction in size allows the rotary valve 200 to meter flow exiting a given chamber to slow down the piston 101 and prevent cavitating another chamber being filled. FIGS. 10B-10D illustrates specific scenarios to illustrate cavitation prevention.

FIG. 10B illustrates metering diagram while the piston 101 is retracting with load assistance, in accordance with an example implementation. FIG. 10B illustrates windows contained in portion "A" labelled in FIG. 10A. In an example, the piston 101 may be retracting (e.g., moving to the left in FIG. 8B) aided by a load (e.g., assisted by gravity). During retraction of the piston 101, fluid may be discharging from the chamber C1, while the chambers C2 and C3 are being filled with fluid. In this example, the controller of the hydraulic system may seek to brake (i.e., reduce the speed of) the piston 101 to control the retraction motion. To reduce the speed of the piston 101, the controller may command the spool 204 to a rotary position where the window 656 of the spool 204 is partially aligned with the window 331B of the sleeve 202. In this manner, the rotary valve 200 meters fluid discharged from the chamber C1 to control the speed of retraction of the piston 101. Further, to prevent cavitation of the chambers C2 and C3, the window 332B is fully aligned with the window 660, the window 334C is fully aligned with the window 666, and the window 332D is fully aligned with the window 668. Thus, path of fluid withdrawn from the low pressure fluid reservoir 110 is wide open to the chambers C2 and C3, and thus likelihood of cavitating the chambers C2 and C3 is reduced.

Similarly, FIG. 10C illustrates alignment of windows while the actuator 100 is in coasting mode, in accordance with an example implementation. In some applications for an actuator such as the actuator 100, all three chambers may be connected to the low pressure fluid reservoir 110 so as to not consume high pressure fluid from the high pressure fluid source 108. In these applications, all windows of the sleeve 202 may be fully aligned with respective windows of the spool 204 as shown in FIG. 10C. In this configuration, path of fluid withdrawn from the low pressure fluid reservoir 110 is wide open to all three chambers, and thus likelihood of cavitating any of the chambers is reduced.

Similarly, FIG. 10D illustrates alignment of windows while the actuator 100 is extending with load assistance, in accordance with an example implementation. In an example, the piston 101 may be extending (e.g., moving to the right in FIG. 8B) aided by a load (e.g., assisted by gravity). During extension of the piston 101, fluid may be discharging from the chambers C2 and C3, while the chamber C1 is being filled with fluid. In this example, the controller of the hydraulic system may seek to brake the piston 101 to control the piston's extension. To reduce the speed of the piston 101, the controller may command the spool 204 to a rotary position where the window 660 is partially aligned with the window 332B and the windows 666 and 668 are partially aligned with the windows 334C and 334D, respectively. In this manner, the rotary valve 200 meters fluid discharged from the chambers C2 and C3 to control the speed of extension of the piston 101. Further, to prevent cavitation of the chamber C1, the window 331B is fully aligned with the window 656. Thus, path of fluid withdrawn from the low pressure fluid reservoir 110 is wide open to the chamber C1, and thus likelihood of cavitating the chamber C1 is reduced.

FIGS. 10A-10D thus illustrate that the rotary valve 200 can be used to prevent cavitation, without using check valves, in operation modes where all three chambers are in fluid communication with the low pressure fluid reservoir 110. However, offsetting the windows of the sleeve 204 may alleviate cavitation in other operation modes as well.

FIG. 11A illustrates metering while the piston 101 is extending, with load assistance, and the chamber C2 regenerating fluid back to the high pressure fluid source 108, in accordance with an example implementation. In the mode shown in FIG. 11A, during extension of the piston 101, fluid may be discharging from the chamber C2 and regenerating to the high pressure fluid source 108. Fluid discharging from the chamber C3 is directed to the low pressure fluid reservoir 110. The chamber C1 is being filled with fluid during extension to prevent cavitation. Thus, as shown in FIG. 11A, the windows of the sleeve 202 and the respective windows of the spool 204 that control fluid to and from the chambers C2 and C3 are partially aligned so as to meter fluid discharged from both chambers and reduce the speed of the piston 101. However, the windows of the sleeve 202 and the respective windows of the spool 204 that control fluid flow to and from the chamber C1 are fully aligned. In this manner, path of fluid withdrawn from the low pressure fluid reservoir 110 is wide open to the chamber C1, and thus likelihood of cavitating the chamber C1 is reduced.

FIG. 11B illustrates metering while the piston 101 is retracting, with load assistance, and the chamber C2 connected to the high pressure fluid source 108, in accordance with an example implementation. In the mode shown in FIG. 11B, during retraction of the piston 101, fluid may be discharging from the chamber C1 to the low pressure fluid reservoir 110. The chamber C2 is being filled with fluid from the high pressure fluid source 108, while the chamber C3 is being filled with fluid from the low pressure fluid reservoir 110. To prevent cavitation of the chamber C3, the windows of the sleeve 202 and the respective windows of the spool 204 that control fluid to and from the chamber C1 are partially aligned. In this manner, fluid discharging from the chamber C1 is metered to reduce the speed of the piston 101. However, the windows of the sleeve 202 and the respective windows of the spool 204 that control fluid flow to and from the chambers C2 and C3 are fully aligned. Consequently, path of fluid directed from the low pressure fluid reservoir 110 to the chamber C3 is unrestricted, and thus likelihood of cavitating the chamber C3 is reduced.

FIGS. 10A-10D and 11A-11B thus illustrate that the rotary valve 200 can be used to prevent cavitation without using check valves in addition to controlling the speed of the piston 101. As a consequence, the cost, size, and complexity of the hydraulic system may be reduced.

IV. EXAMPLE ALTERNATIVE VALVE CONFIGURATIONS

The rotary valve 200 illustrated and described in FIGS. 2-11B is an example implementation. Other valve implementations are also possible as described next in FIG. 12.

Figure 12:
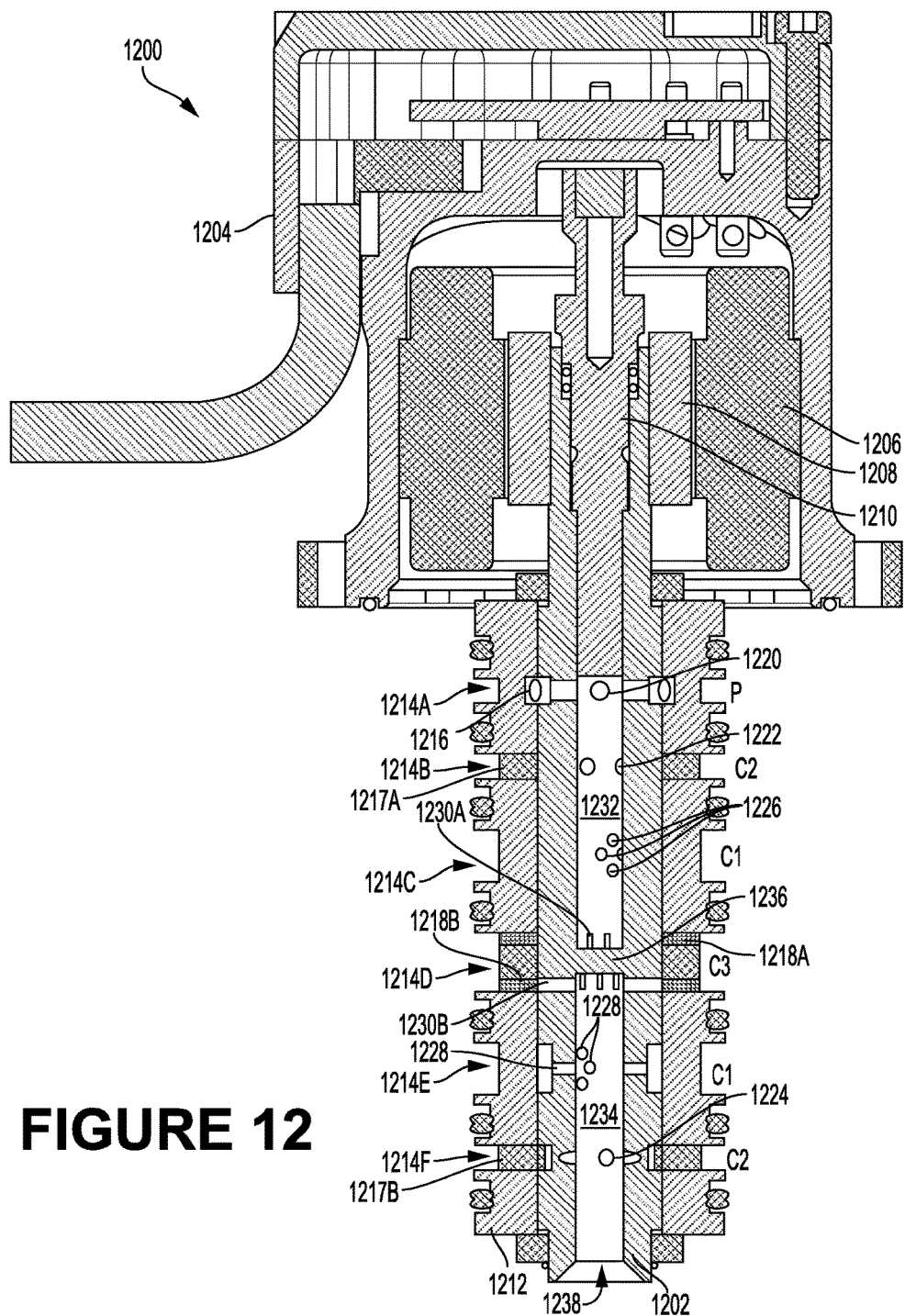
FIG. 12 illustrates a cross section of a rotary valve having two inline internal chambers in a spool, in accordance with an example implementation.

FIG. 12 illustrates a cross section of a rotary valve 1200 having two inline internal chambers in a spool 1202, in accordance with an example implementation. The rotary valve 1200 differs from the rotary valve 200 in the arrangement of the internal channels. The spool 204 of the rotary valve 200 has the high pressure internal channels 338 in a 1×1 interleaving arrangement with the low pressure internal channels 342. The spool 1202, however, has a high pressure channel longitudinally stacked in line with a low pressure channel inside the spool 1202 as described below. Due to such inline construction of the internal channels, the rotary valve 1200 may have extra ports along its length and may thus be longer compared to the rotary valve 200.

The rotary valve 1200 may include a housing or end cap 1204 that houses a rotary actuator, such as a brushless direct current (DC) motor including a stator 1206 and a rotor 1208. A rotor bolt 1210 is coupled to, and configured to rotate with, the rotor 1208. The spool 1202 is coupled to and configured to rotate with the rotor 1208. The rotary actuator described with respect to FIG. 12 can be integrated with the rotary valve 200 to rotate the spool 204 as well. Further, a controller of the hydraulic system may be configured to provide a signal to the rotary actuator so as to rotate the spool 1202 to a particular rotary position. The controller may be a computing device comprising one or more processors configured to execute program instructions stored in the computing device (e.g., a memory within the computing device), for example.

The sleeve 1212 may have a plurality of openings configured along a length of the sleeve 1212. The openings may be disposed in annular grooves such as annular grooves 1214A, 1214B, 1214C, 1214D, 1214E, and 1214F. The openings may be arranged axially along the sleeve 1212. The rotary valve 1200 could be inserted in a manifold (not shown) where the manifold include ports that connect the rotary valve 1200 to the high pressure fluid source 108, the low pressure fluid reservoir 110, and the chambers C1, C2, and C3.

The sleeve 1212 may include openings such as an opening 1216 disposed in the annular groove 1214A. The opening 1216 may be configured to communicate fluid to and from the high pressure fluid source 108. Similarly, the sleeve 1212 may include openings such as openings 1217A and 1217B in the grooves 1214B and 1214F, respectively, configured to communicate fluid to and from the chamber C2. Also, the sleeve 1212 may include openings in the grooves 1214C and 1214E configured to communicate fluid to and from the chamber C1. Further, the sleeve 1212 may include openings such as openings 1218A and 1218B in the groove 1214D configured to communicate fluid to and from the chamber C3.

The spool 1202 is rotatable within the sleeve 1212 and includes a respective plurality of openings along a length of the spool 1202 corresponding to the plurality of openings of the sleeve 1212. For example, the spool 1202 may include openings, such as an opening 1220, that correspond to openings such as the opening 1216 in the groove 1214A of the sleeve 1212. Similarly, the spool 1202 may include openings, such as openings 1222 and 1224, that correspond to openings 1217A and 1217B in the grooves 1214B and 1214F of the sleeve 1212, respectively. Also, the spool 1202 may include openings such as openings 1226 and 1228 that correspond to openings in the grooves 1214C and 1214E of the sleeve 1212, respectively. Further, the spool 1202 may include openings such as openings 1230A and 1230B that correspond to openings such as the openings 1218A and 1218B in the groove 1214D of the sleeve 1212.

As mentioned above and shown in the Figures, the chamber C1 is larger in volume than the chambers C2 and C3. Therefore, the spool openings 1226 and 1228 that communicate fluid to and from the chamber C1 are greater in number compared to the spool openings 1222 and 1224 that communicate fluid to and from the chamber C2. Similarly, the spool openings 1226 and 1228 that communicate fluid to and from the chamber C1 are greater in number compared to the spool openings 1230A or 1230B that communicate fluid to and from the chamber C3. However, such configuration may vary based on the configuration of the actuator 100.

As mentioned above, instead of the 1×1 interleaving high pressure channels and low pressure channels described with respect to the spool 204 of the rotary valve 200, the spool 1202 includes two longitudinally stacked, inline chambers 1232 and 1234. The chamber 1232 is a high pressure channel separated by a rib 1236 from the low pressure channel 1234. The high pressure channel 1232 is in fluid communication with the high pressure fluid source 108 by way of openings such as the openings 1220 and 1216, the groove 1214A, and corresponding channels and openings in a manifold configured to house the rotary valve 1200. The low pressure channel 1234 is in fluid communication with the low pressure fluid reservoir 110 by way of an opening 1238 disposed at the bottom or free end of the spool 1202.

Based on the rotary position of the spool 1202, the high pressure channel 1232 could be in fluid communication with all or a subset of the chambers C1, C2, and C3. For instance, at a given rotary position of the spool 1202, the opening 1222 of the spool 1202 may be aligned, at least partially, with a respective sleeve opening (e.g., the opening 1217A) disposed in the annular groove 1214B. In this manner, the high pressure channel 1232 could be in fluid communication with the chamber C2. Similarly, the high pressure channel 1232 could be in fluid communication with the chamber C1 if the opening 1226 is, at least partially, aligned with the respective sleeve opening in the annular groove 1214C. The high pressure channel 1232 could be in fluid communication with the chamber C3 if the opening 1230A is, at least partially, aligned with the respective sleeve opening 1218A in the annular groove 1214D.

Also, based on the rotary position of the spool 1202, the low pressure channel 1234 could be in fluid communication with all or a subset of the chambers C1, C2, and C3. For instance, the low pressure channel 1234 could be in fluid communication with the chamber C2 if the opening 1224 is, at least partially, aligned with the respective sleeve opening (e.g., the opening 1217B) in the annular groove 1214F. Similarly, the low pressure channel 1234 could be in fluid communication with the chamber C1 if the opening 1228 is, at least partially, aligned with the respective sleeve opening in the annular groove 1214E. The low pressure channel 1234 could be in fluid communication with the chamber C3 if the opening 1230B is, at least partially, aligned with the respective sleeve opening 1218B in the annular groove 1214D as depicted in FIG. 12.

In this manner, the rotary actuator may be configured to enable 360° rotation of the spool 1202 to any given position to selectively align a subset of openings in the spool 1202 with a subset of openings in the sleeve 1212. Based on the position of the spool 1202 and which openings are aligned, the actuator 100 may operate in a particular mode (e.g., applying positive force mode, brake mode, negative force mode, etc.) and achieve one of eight force levels.

Only a subset of openings in the spool 1202 and the sleeve 1212 are shown in FIG. 12. However, for each opening shown in FIG. 12, multiple other openings are disposed around a circumference (e.g., in a circular array) of the spool 1202 and a circumference of the sleeve 1212. Such construction balances the radial pressure forces acting on the spool 1202 and minimizes friction of the spool 1202 while rotating in the sleeve 1212. In the description below, reference to one of the openings includes reference to the opening and corresponding openings along the circumference of the spool 1202 or the sleeve 1212. For example, referring to the opening 1222 in the spool 1202 includes reference to the opening 1222 shown in FIG. 12 and other corresponding spool openings along a circumference of the spool 1202.

FIGS. 13A-13D illustrate schematics of the spool 1202 at four of the eight different rotary positions, in accordance with an example implementation. In describing FIGS. 13A-13B, it is assumed that the rotary valve 1200 is disposed within a manifold, the ports of which are connected to the actuator 100 such that the rotary valve 1200 controls motion of the piston 101.

Figure 13B:
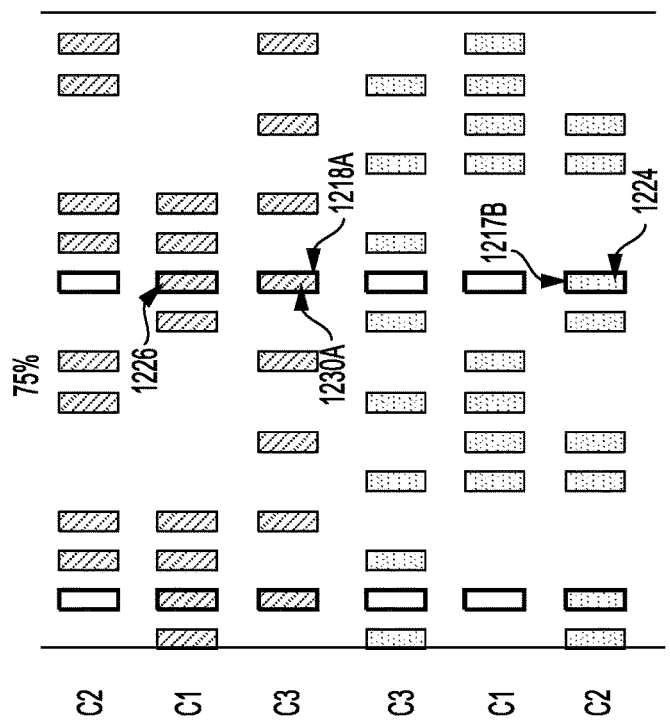
FIGS. 13A-13D illustrate schematics of the spool illustrated in FIG. 12 at four of the eight different rotary positions, in accordance with an example implementation.
Figure 13A:
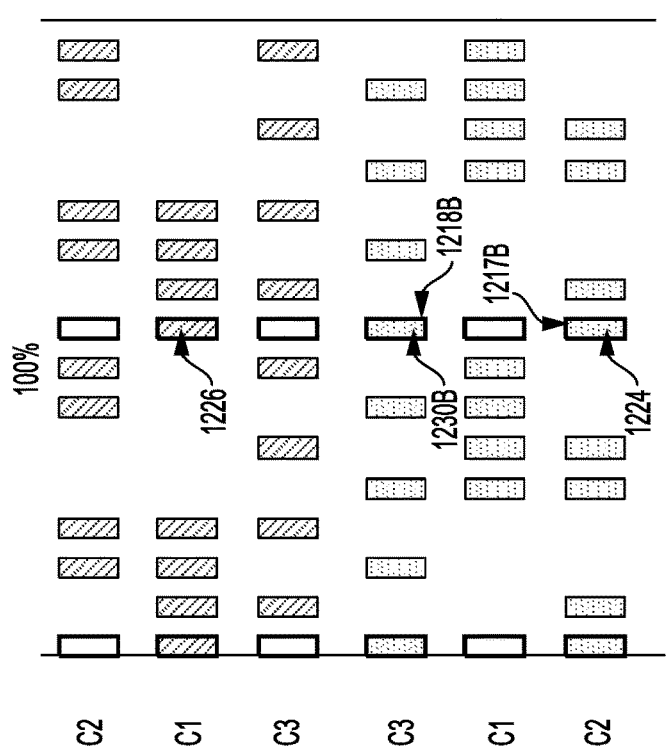

FIG. 13A shows alignment of spool and sleeve openings while the spool 1202 is at a first rotary position within the sleeve 1212. At this first rotary position, the spool opening 1226 is aligned with a respective sleeve opening disposed in the annular groove 1214C. Also, the spool opening 1230B is aligned with the respective sleeve opening 1218B disposed in the annular groove 1214D, and the opening 1224 is aligned with the respective sleeve opening 1217B disposed in the annular groove 1214F. Thus, the chamber C1 is in fluid communication with high pressure fluid, while both the chambers C2 and C3 are in fluid communication with low pressure fluid. The force exerted by the piston 101 in this case is a maximum force expressed in equation (4) above.

FIG. 13B shows alignment of spool and sleeve openings while the spool 1202 is at a second rotary position within the sleeve 1212. At this second rotary position, the spool opening 1226 is aligned with a respective sleeve opening disposed in the annular groove 1214C. Also, the spool opening 1230A is aligned with the respective sleeve opening 1218A disposed in the annular groove 1214D, and the opening 1224 is aligned with the respective sleeve opening 1217B disposed in the annular groove 1214F. Thus, the chambers C1 and C3 are in fluid communication with high pressure fluid, while the chamber C2 is in fluid communication with low pressure fluid. The force exerted by the piston 101 in this case is 75% of the maximum force as expressed in equation (5) above.

Figure 13D:
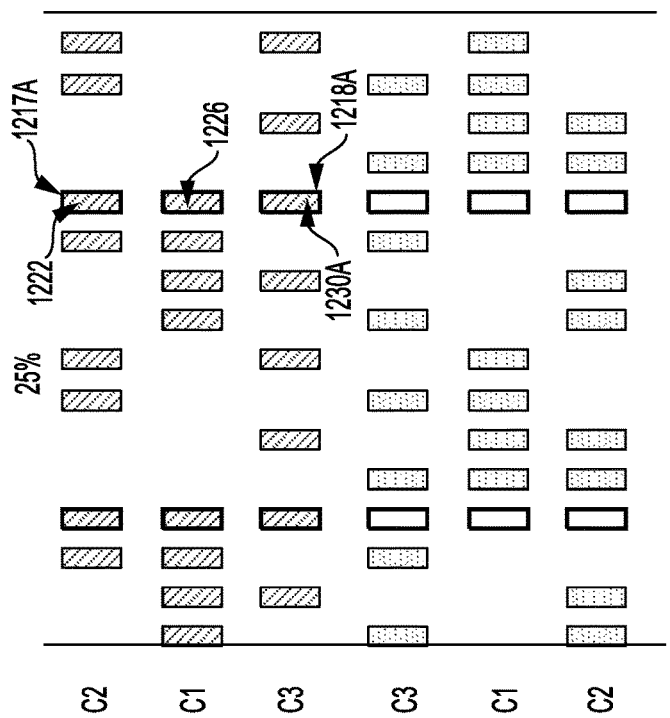
Figure 13C:
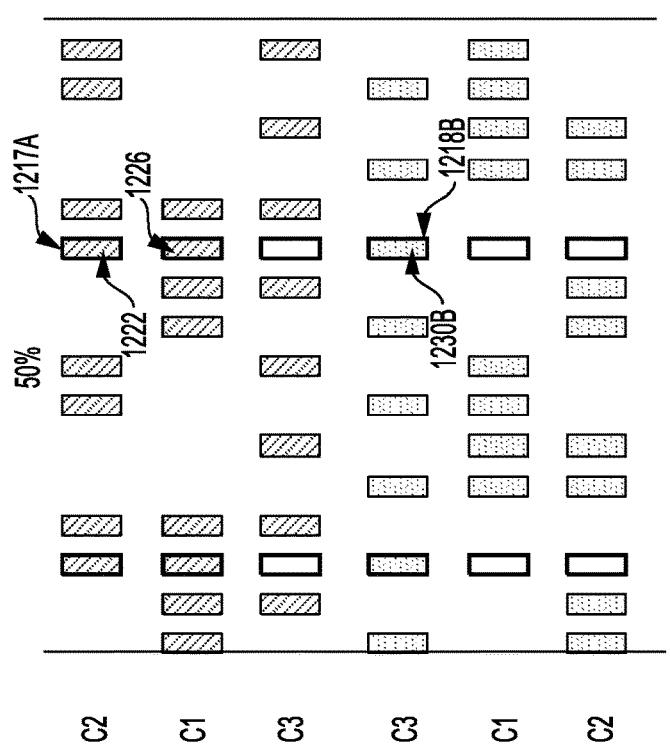

FIG. 13C shows alignment of spool and sleeve openings while the spool 1202 is at a third rotary position within the sleeve 1212. At this third rotary position, the spool opening 1222 is aligned with the respective sleeve opening 1217A disposed in the annular groove 1214B. Also, the opening 1226 is aligned with a respective sleeve opening disposed in the annular groove 1214C, and the spool opening 1230B is aligned with the respective sleeve opening 1218B disposed in the annular groove 1214D. Thus, the chambers C1 and C2 are in fluid communication with high pressure fluid, while the chamber C3 is in fluid communication with low pressure fluid. The force exerted by the piston 101 in this case is 50% of the maximum force as expressed in equation (6) above.

FIG. 13D shows alignment of spool and sleeve openings while the spool 1202 is at a fourth rotary position within the sleeve 1212. At this fourth rotary position, the spool opening 1222 is aligned with the respective sleeve opening 1217A disposed in the annular groove 1214B, and the opening 1226 is aligned with a respective sleeve opening disposed in the annular groove 1214C. Further, the spool opening 1230A is aligned with the respective sleeve opening 1218A disposed in the annular groove 1214D. Thus, all three chambers C1, C2, and C3 are in fluid communication with high pressure fluid. The force exerted by the piston 101 in this case is 25% of the maximum force as expressed in equation (7) above.

Although not shown, the spool 1202, like the spool 204 of the rotary valve 200, can be rotated to at least four other rotary positions to achieve 0%, −25, −50%, and −75% force levels as expressed by equations (8), (9), (10), and (11), respectively.

Equations (4)-(11) assume that losses due to pressure drop across hydraulic lines connecting the rotary valve 200 or 1200 to the actuator 100 are negligible. If such hydraulic line losses are not negligible (e.g., such as in the case of long hydraulic lines), the actual force levels may be slightly different from the values computed using equations. To reduce hydraulic line losses, the rotary valve 200 or 1200 may be integrated with the actuator 100 to substantially reduce lengths of hydraulic lines connecting the rotary valve 200 or 1200 to the actuator 100.

Figure 14A:
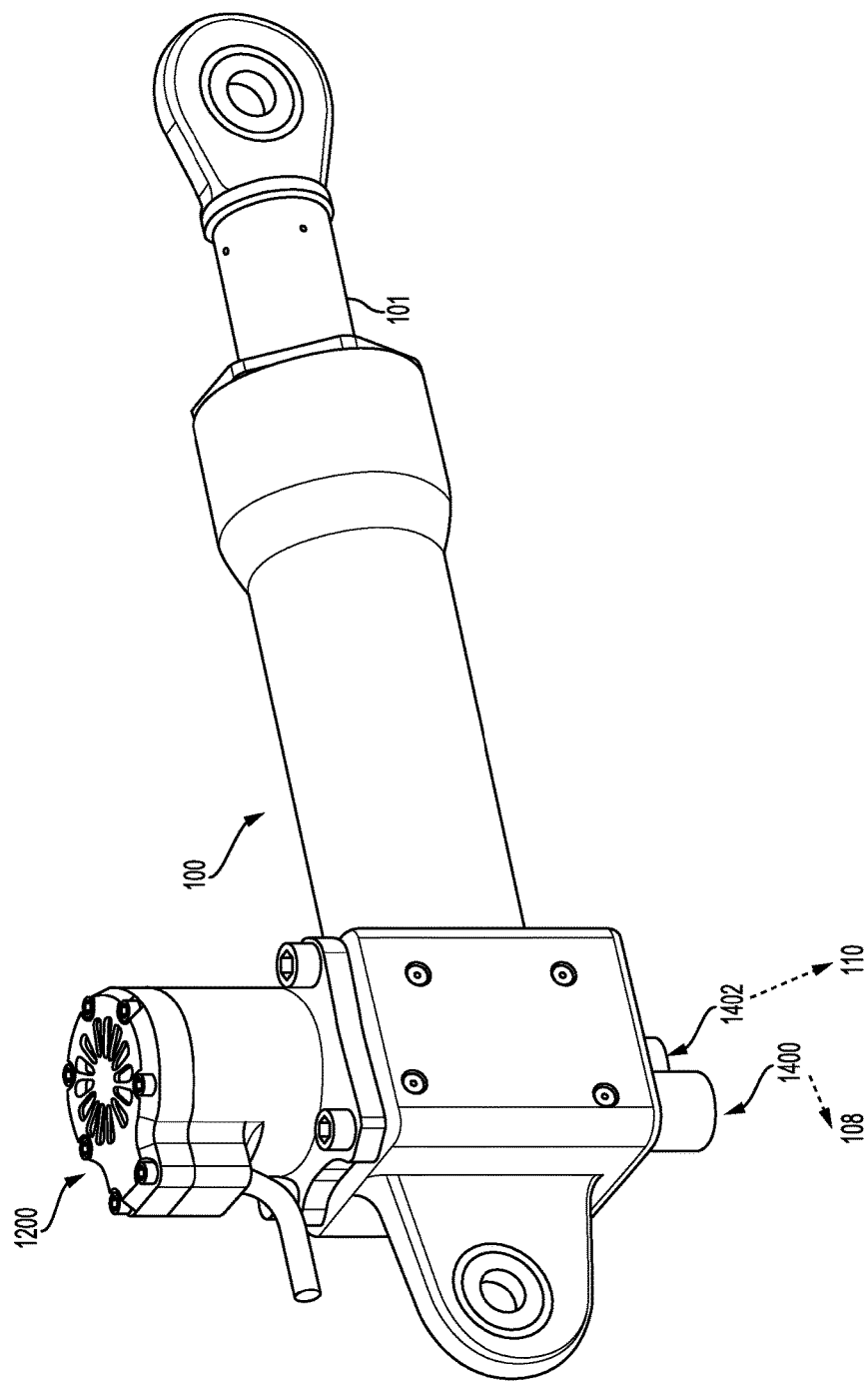
FIGS. 14A-14C illustrates the rotary valve illustrated in FIG. 12 integrated with the actuator, in accordance with an example implementation.
Figure 14B:
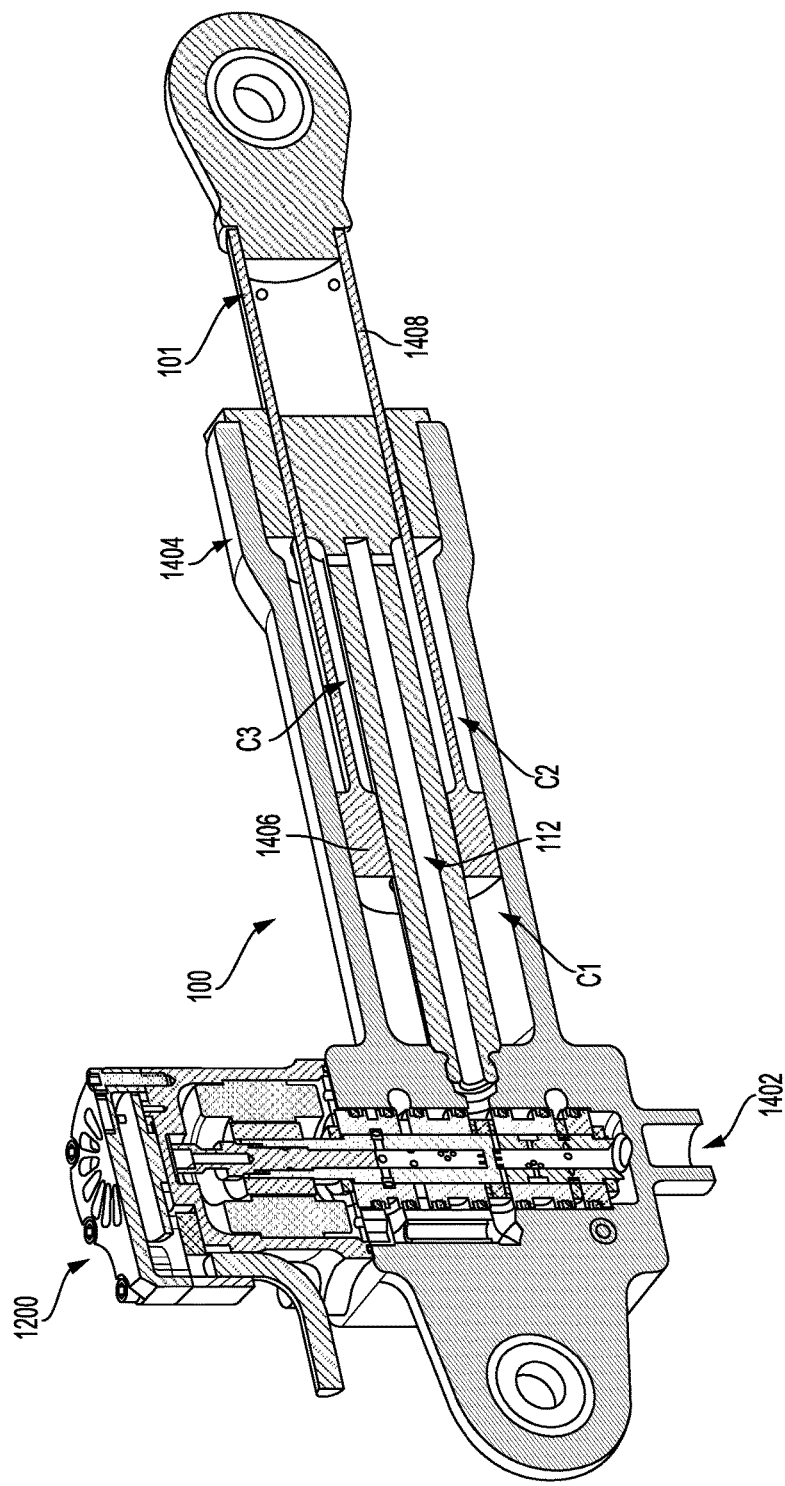
Figure 14C:
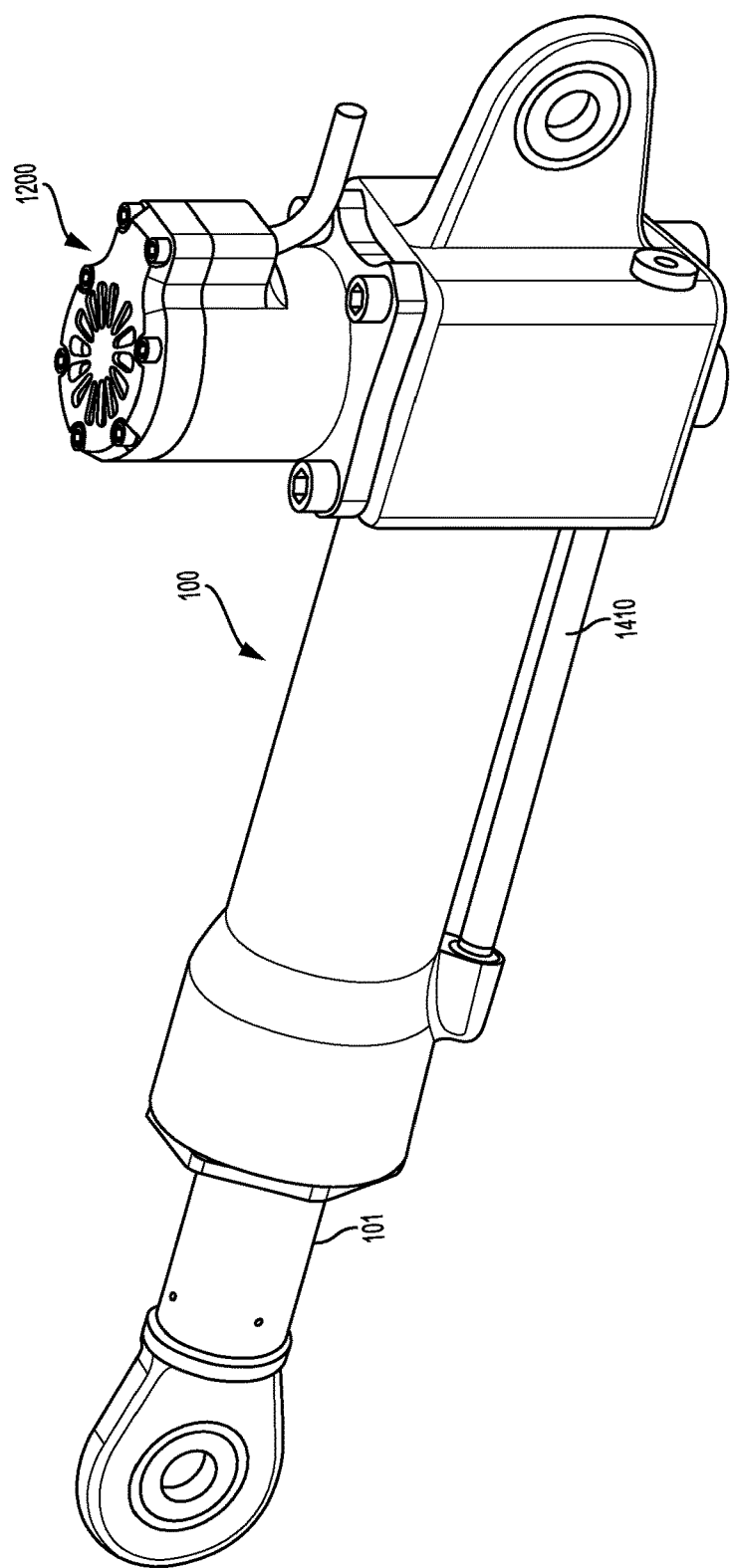

FIGS. 14A-14C illustrates the rotary valve 1200 integrated with the actuator 100, in accordance with an example implementation. FIG. 14A illustrates the rotary valve 1200 and the actuator 100 coupled into an integrated package. FIG. 14A also depicts a port 1400 that connects the rotary valve 1200 to the high pressure fluid source 108, and a port 1402 that connects the rotary valve 1200 to the low pressure fluid reservoir 110.

FIG. 14B illustrates a perspective sectional view of the package shown in FIG. 14A. FIG. 14B shows the three chambers C1, C2, and C3 similar to the configuration shown in FIG. 1 where fluid in the chamber C1 acts on the piston 101 in a direction opposite to direction of action of fluid in the chambers C2 and C3. As depicted in FIG. 14B, the actuator 100 includes a cylinder 1404 and the piston 101. The piston 101 includes a piston head 1406 and a tubular rod 1408 attached to the piston head 1406. The piston 101 is slidably received within the cylinder 1404, with an end of the tubular rod 1408 projecting outward from the cylinder 1404. The chambers C1 and C2 are defined on opposing sides of the piston head 1406, and the chamber C3 is defined within the tubular rod 1408. However, this is an example configuration for illustration only. As mentioned above, configuration of the actuator depends on a particular application the actuator is used in.

FIG. 14C depicts a tube 1410 connecting back end of the actuator 100 to the chamber C2. Thus, the tube 1404 may be configured to communicate fluid back and forth between the rotary valve 1200 and the chamber C2.

The configuration shown in FIGS. 14A-14C is an example for illustration only. Other configurations are possible. For instance, the rotary valve 200 can be used instead of the rotary valve 1200. The chamber configuration within the actuator 100 can be changed depending on the application for which the actuator 100 is being used.

Also, although the actuator 100 described herein to be controlled by the rotary valves 200 and 1200 is a hydraulic cylinder, a hydraulic motor (e.g., a mechanical actuator that converts hydraulic pressure and flow into torque and angular displacement/rotation) is also contemplated. Further, although the actuator 100 includes three chambers, the valves and systems described herein can be expanded to control actuators having four or more chambers.

In the case of a hydraulic cylinder, the areas $A_1$, $A_2$, and $A_3$ represent a ratio of force/pressure. For example, the area $A_1$ represents a ratio of force applied by fluid in the chamber C1 on the piston 101 and pressure applied by the fluid on the area A1 of the piston 101 in the chamber C1. For a hydraulic motor, the area would represent a torque/pressure ratio.

In an example implementation, instead of using a single hydraulic cylinder actuator with three chambers having different piston areas, such as the actuator 100, three different actuators could be used. For instance, the three actuators could be attached to a lever coupled to a hinged joint. The three actuators could be equally sized single-acting hydraulic cylinders, and thus have equal areas that fluid pressure acts on. However, the actuators could be acting at radii 4", 2" and 1", respectively, where a radius is a distance between the hinged joint and a point on the lever where the respective actuator is attached. In this case, the piston "areas" are equal, but the torque that a respective actuator applies on the joint depends on the respective radius, and a rotary valve such as the rotary valves 200 and 1200 could be used to provide the desired 8 different torque levels on the joint by controlling the force exerted by each of the three actuators.

V. CONCLUSION

It should be understood that arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A rotary valve comprising:
a sleeve having a plurality of sleeve openings;
a spool rotatable within the sleeve, wherein the spool includes a plurality of spool openings respectively corresponding to the plurality of sleeve openings, wherein the spool has two high pressure internal channels in fluid communication with a high pressure fluid source and two low pressure internal channels in fluid communication with a low pressure fluid reservoir, and wherein the two high pressure internal channels are 1×1 interleaved with the two low pressure internal channels; and
a rotary actuator coupled to the spool and configured to rotate the spool within the sleeve, wherein rotating the spool causes the spool to assume one rotary position of at least eight rotary positions, wherein, at each rotary position, a subset of the plurality of spool openings is at least partially aligned with a subset of the plurality of sleeve openings, to connect (i) a first chamber of a hydraulic actuator to either the high pressure fluid source or the low pressure fluid reservoir, (ii) a second chamber of the hydraulic actuator to either the high pressure fluid source or the low pressure fluid reservoir, and (iii) a third chamber of the hydraulic actuator to either the high pressure fluid source or the low pressure fluid reservoir.

2. The rotary valve of claim 1, wherein at least some of the sleeve openings are arranged in a circular array within a respective annular groove around a circumference of the sleeve.

3. The rotary valve of claim 1, further comprising a manifold, wherein the sleeve and the spool are disposed within the manifold, and wherein the manifold includes a plurality of manifold openings configured to communicate fluid between (i) the high pressure fluid source, the low pressure fluid reservoir, and the chambers of the hydraulic actuator, and (ii) the plurality of sleeve openings.

4. The rotary valve of claim 1, wherein at least some of the respective spool openings are arranged in a circular array around a circumference of the spool.

5. The rotary valve of claim 1, wherein at least some of the plurality of sleeve openings are configured to communicate fluid to and from an annular groove configured around the sleeve.

6. The rotary valve of claim 5, wherein the sleeve comprises one annular grooves configured to communicate fluid to and from the high pressure fluid source, one annular grooves configured to communicate fluid to and from the first chamber, one annular grooves configured to communicate fluid to and from the second chamber, and one annular groove configured to communicate fluid to and from the third chamber.

7. The rotary valve of claim 1, wherein an opening in the spool corresponding to a second opening in the sleeve is located at a free end of the spool.

8. A hydraulic system comprising:
a hydraulic actuator including a first chamber, a second chamber, and a third chamber;
a high pressure fluid source;
a low pressure fluid reservoir; and
a rotary valve comprising:
a sleeve having a plurality of sleeve openings,
a spool rotatable within the sleeve, wherein the spool includes a plurality of spool openings respectively corresponding to the plurality of sleeve openings, wherein the spool has two high pressure internal channels in fluid communication with the high pressure fluid source and two low pressure internal channels in fluid communication with the low pressure fluid reservoir, and wherein the two high pressure internal channels are 1×1 interleaved with the two low pressure internal channels, and a rotary actuator coupled to the spool and configured to rotate the spool within the sleeve, wherein rotating the spool causes the spool to assume one rotary position of at least eight rotary positions, wherein, at each rotary position, a subset of the plurality of spool openings is at least partially aligned with a subset of the plurality of sleeve openings, to connect (i) the first chamber to either the high pressure fluid source or the low pressure fluid reservoir, (ii) the second chamber to either the high pressure fluid source or the low pressure fluid reservoir, and (iii) the third chamber to either the high pressure fluid source or the low pressure fluid reservoir.

9. The hydraulic system of claim 8, wherein the plurality of sleeve openings include at least: a first opening configured to communicate fluid to and from the high pressure fluid source, a second opening configured to communicate fluid to and from the low pressure fluid reservoir, a third opening configured to communicate fluid to and from the first chamber of the hydraulic actuator, a fourth opening configured to communicate fluid to and from the second chamber of the hydraulic actuator, and a fifth opening configured to communicate fluid to and from the third chamber of the hydraulic actuator.

10. The hydraulic system of claim 9, wherein the high pressure internal channels are configured to communicate fluid between the first opening and one or more of the third opening, the fourth opening, and the fifth opening, and wherein the low pressure internal channels are configured to communicate fluid between the second opening and one or more of the third opening, the fourth opening, and the fifth opening.

11. The hydraulic system of claim 9, wherein the respective spool openings corresponding to the third opening are larger in size than the respective spool openings corresponding to the fourth opening, and the respective spool openings corresponding to the fifth opening.

12. The hydraulic system of claim 8, wherein at least some of the sleeve openings are arranged in a circular array within a respective annular groove around a circumference of the sleeve.

13. The hydraulic system of claim 8, further comprising a manifold, wherein the sleeve and the spool are disposed within the manifold, and wherein the manifold includes a plurality of manifold openings configured to communicate fluid between (i) the high pressure fluid source, the low pressure fluid reservoir, and the chambers of the hydraulic actuator, and (ii) the plurality of sleeve openings.

14. The hydraulic system of claim 8, wherein at least some of the respective spool openings are arranged in a circular array around a circumference of the spool.

15. The hydraulic system of claim 8, wherein at least some of the plurality of sleeve openings are configured to communicate fluid to and from an annular groove configured around the sleeve.

16. The hydraulic system of claim 8, wherein the sleeve comprises one annular grooves configured to communicate fluid to and from the high pressure fluid source, one annular grooves configured to communicate fluid to and from the first chamber, one annular grooves configured to communicate fluid to and from the second chamber, and one annular groove configured to communicate fluid to and from the third chamber.

17. The hydraulic system of claim 8, wherein an opening in the spool corresponding to the second opening in the sleeve is located at a free end of the spool.

* * * * *